United States Patent
Wang et al.

(10) Patent No.: US 12,294,979 B2
(45) Date of Patent: *May 6, 2025

(54) SIDELINK FEEDBACK FOR MULTIPLE TRANSMIT RECEIVE POINTS

(71) Applicant: QUALCOMM Incorporated, San Diego, CA (US)

(72) Inventors: Xiaojie Wang, Hillsborough, NJ (US); Piyush Gupta, Bridgewater, NJ (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,361

(22) Filed: Dec. 15, 2023

(65) Prior Publication Data

US 2024/0172190 A1   May 23, 2024

Related U.S. Application Data

(63) Continuation of application No. 17/221,584, filed on Apr. 2, 2021, now Pat. No. 11,882,546.

(51) Int. Cl.
*H04W 72/04* (2023.01)
*H04L 12/18* (2006.01)
*H04W 4/06* (2009.01)

(52) U.S. Cl.
CPC ............. *H04W 72/04* (2013.01); *H04W 4/06* (2013.01); *H04L 12/189* (2013.01)

(58) Field of Classification Search
CPC ... H04B 7/0639; H04B 7/0695; H04L 1/1614; H04L 1/1822; H04L 1/1854;
(Continued)

(56) References Cited

U.S. PATENT DOCUMENTS 11,627,560 B2 * 4/2023 Park ................... H04W 72/0446
370/329
11,706,593 B2   7/2023 Uchiyama et al.
(Continued)

FOREIGN PATENT DOCUMENTS

WO   2020004894 A1   1/2020
WO   2020144261 A1   7/2020

OTHER PUBLICATIONS

International Search Report and Written Opinion—PCT/US2022/015079—ISA/EPO—May 4, 2022.

*Primary Examiner* — Marcus Smith
*Assistant Examiner* — Kai Chang
(74) *Attorney, Agent, or Firm* — Arun Swain

(57) ABSTRACT

Methods, systems, and devices for wireless communications are described. Generally, a user equipment (UE) may transmit feedback signaling for received sidelink messages to both the base station and the transmitting UE. The receiving UE may multicast a feedback message to both the base station and the transmitting UE on a physical uplink control channel (PUCCH) or on a physical sidelink feedback channel (PSFCH). The base station may configure the receiving UE with resources, the transmitting UE may allocate resources to the receiving UE, or the base station may actively monitor for the feedback message. In some examples, the receiving UE may operate in a dual connectivity mode, and may transmit the feedback message to both the base station and the transmitting UE on both the PUCCH and the PSFCH.

20 Claims, 17 Drawing Sheets

(58) Field of Classification Search
CPC ... H04L 1/1861; H04L 1/1893; H04L 5/0055; H04L 5/0094; H04L 12/189; H04L 2001/0093; H04W 4/06; H04W 72/04
See application file for complete search history.

(56) References Cited

U.S. PATENT DOCUMENTS

| | | | |
|---|---|---|---|
| 11,722,255 | B2 | 8/2023 | Park |
| 12,167,405 | B2* | 12/2024 | Nayeb Nazar ........ H04L 5/0055 |
| 2014/0010175 | A1 | 1/2014 | Chiu |
| 2015/0023267 | A1 | 1/2015 | Lim et al. |
| 2017/0288819 | A1 | 10/2017 | Chen et al. |
| 2018/0152915 | A1 | 5/2018 | Kalhan |
| 2019/0223123 | A1* | 7/2019 | Tang ................... H04W 56/001 |
| 2020/0037343 | A1 | 1/2020 | He et al. |
| 2020/0154404 | A1* | 5/2020 | Göktepe et al. ........ H04W 4/06 |
| 2020/0229145 | A1 | 7/2020 | Kang et al. |
| 2020/0275413 | A1 | 8/2020 | Zhang et al. |
| 2020/0389257 | A1 | 12/2020 | Kung et al. |
| 2021/0037503 | A1 | 2/2021 | Nam et al. |
| 2021/0050950 | A1* | 2/2021 | Zhou .................... H04W 72/21 |
| 2021/0050953 | A1* | 2/2021 | Park ..................... H04L 1/1819 |
| 2021/0120600 | A1 | 4/2021 | Park et al. |
| 2021/0410178 | A1 | 12/2021 | Wang et al. |
| 2022/0029747 | A1 | 1/2022 | Xue et al. |
| 2022/0116915 | A1* | 4/2022 | Zhou ................. H04W 74/0808 |
| 2022/0167312 | A1* | 5/2022 | Lee ....................... H04L 1/1812 |
| 2022/0173874 | A1 | 6/2022 | Fehrenbach et al. |
| 2022/0225400 | A1 | 7/2022 | Wong et al. |
| 2022/0232529 | A1 | 7/2022 | Lin |
| 2022/0271868 | A1* | 8/2022 | Cheng .................. H04W 72/23 |
| 2022/0322305 | A1 | 10/2022 | Wang et al. |
| 2022/0360414 | A1 | 11/2022 | Liu et al. |
| 2022/0385413 | A1 | 12/2022 | Zhao |
| 2023/0019726 | A1 | 1/2023 | Kwon |
| 2023/0113672 | A1 | 4/2023 | Wu |
| 2023/0232422 | A1* | 7/2023 | Lee ....................... H04L 5/0053 370/329 |

\* cited by examiner

SIDELINK FEEDBACK FOR MULTIPLE TRANSMIT RECEIVE POINTS

FIELD OF TECHNOLOGY

The present Application for Patent is a continuation of U.S. patent application Ser. No. 17/221,584 by Wang et al., entitled "SIDELINK FEEDBACK FOR MULTIPLE TRANSMIT RECEIVE POINTS," filed Apr. 2, 2021, which is assigned to the assignee hereof, and expressly incorporated by reference herein.

FIELD OF TECHNOLOGY

The following relates to wireless communications, including sidelink feedback for multiple transmit receive points.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink feedback for multiple transmit receive points. Generally, a user equipment (UE) may transmit feedback signaling for received sidelink messages to both the base station and the transmitting UE. The receiving UE may multicast a feedback message to both the base station and the transmitting UE (e.g., using one or more beams directed to both the base station and the transmitting UE) on a physical uplink control channel (PUCCH) (e.g., on the Uu link) or on a physical sidelink feedback channel (PSFCH) or both. The base station may allocate PUCCH or PSFCH resources to the transmitting UE (e.g., the PLC), and the transmitting UE may delegate the PUCCH or PSFCH resources to the receiving UE. Or, the base station may allocate PUCCH resources directly to the receiving UE, and the receiving UE may utilize the allocated PUCCH or PSFCH resources for transmitting the feedback message. The receiving UE may multicast the feedback message to both the base station and the transmitting UE via the sidelink on a physical sidelink feedback channel (PSFCH). The base station may configure the receiving UE with PSFCH resources, the transmitting UE may allocate PSFCH resources to the receiving UE, or the base station may actively monitor the PSFCH for the feedback message. In some examples, the receiving UE may operate in a dual connectivity mode, and may transmit the feedback message to both the base station and the transmitting UE on both the PUCCH and the PSFCH.

A method for wireless communications at a user equipment (UE) is described. The method may include receiving, from a base station via a first communication link, an allocation of resources for communicating with a second UE via a second communications link, receiving, from the second UE via the second communications link, a sidelink message in accordance with the allocation of resources, and transmitting a feedback message associated with the sidelink message to the base station and the second UE via one or more of the first communication link, or the second communication link.

An apparatus for wireless communications at a UE is described. The apparatus may include a processor, memory coupled with the processor, and instructions stored in the memory. The instructions may be executable by the processor to cause the apparatus to receive, from a base station via a first communication link, an allocation of resources for communicating with a second UE via a second communications link, receive, from the second UE via the second communications link, a sidelink message in accordance with the allocation of resources, and transmit a feedback message associated with the sidelink message to the base station and the second UE via one or more of the first communication link, or the second communication link.

Another apparatus for wireless communications at a UE is described. The apparatus may include means for receiving, from a base station via a first communication link, an allocation of resources for communicating with a second UE via a second communications link, means for receiving, from the second UE via the second communications link, a sidelink message in accordance with the allocation of resources, and means for transmitting a feedback message associated with the sidelink message to the base station and the second UE via one or more of the first communication link, or the second communication link.

A non-transitory computer-readable medium storing code for wireless communications at a UE is described. The code may include instructions executable by a processor to receive, from a base station via a first communication link, an allocation of resources for communicating with a second UE via a second communications link, receive, from the second UE via the second communications link, a sidelink message in accordance with the allocation of resources, and transmit a feedback message associated with the sidelink message to the base station and the second UE via one or more of the first communication link, or the second communication link.

Some examples of the method, apparatuses, and non-transitory computer-readable medium described herein may further include operations, features, means, or instructions for receiving, from the second UE, configuration information for the feedback message, the configuration information including an instruction to utilize resource allocated to the second UE by the base station for transmitting the feedback message on the first communication link on a physical uplink channel.

In some examples of the method, apparatuses, and non-transitory computer-readable medium described herein, the configuration information may include operations, features, means, or instructions for one or more additional feedback bits for multiplexing with the feedback message, time division multiplexing information, frequency division multiplexing information, space division multiplexing information, or any combination thereof.

In some examples of the method, apparatuses, and non-transitory computer-readable medium described herein, the configuration information may include operations, features, means, or instructions for an indication of a first type of codebook, codebook size information, a reporting time period, one or more bits for multiplexing with the feedback message, an indication of a size of the feedback message, a subcarrier spacing for a communication link between the second UE and the base station, a bandwidth part associated with the first communication link, a sidelink resource pool bitmap, an indication of a feedback channel periodicity, or any combination thereof.

In some examples of the method, apparatuses, and non-transitory computer-readable medium described herein, the configuration information may include operations, features, means, or instructions for an indication of a second type of codebook, codebook size information, an indication of a size of the feedback message, an indication of feedback signaling timing for both the first communication link and the second communication link, an indication of a time gap, time domain resource allocation, a sidelink resource pool bitmap, a periodicity for the second communication link, a minimum time gap for the second communication link, a service area identifier, or any combination thereof.

Some examples of the method, apparatuses, and non-transitory computer-readable medium described herein may further include operations, features, means, or instructions for transmitting, to the second UE, the base station, or both, capability information indicating a capability to multicast the feedback message to both the base station and the UE, where transmitting the feedback message may be based on transmitting the capability information.

Some examples of the method, apparatuses, and non-transitory computer-readable medium described herein may further include operations, features, means, or instructions for receiving, from the second UE, an indication of one or more uplink resources of a set of one or more uplink resources on the physical uplink channel, determining, based on the indication of the one or more uplink resources, at least one of the one or more resources for transmitting the feedback message, and transmitting the feedback message on the determined at least one of the one or more resources.

Some examples of the method, apparatuses, and non-transitory computer-readable medium described herein may further include operations, features, means, or instructions for receiving, from the second UE, uplink signaling information including feedback information associated with a third communications link between the second UE and the base station, channel state information, one or more scheduling requests, or any combination thereof, where the configuration information includes one or more rules for multiplexing the signaling information with the feedback message and multiplexing the signaling information with the feedback message in accordance with the one or more rules and based at least in a part on a codebook type for the feedback message, where transmitting the feedback message may be based on the multiplexing.

Some examples of the method, apparatuses, and non-transitory computer-readable medium described herein may further include operations, features, means, or instructions for receiving, from the second UE, a second feedback message associated with a second sidelink message transmitted by the second UE to a third UE and multiplexing the second feedback message with the feedback message, where transmitting the feedback message may be based on the multiplexing.

Some examples of the method, apparatuses, and non-transitory computer-readable medium described herein may further include operations, features, means, or instructions for monitoring a third communication link between the second UE and a third UE, receiving a second feedback message transmitted by the third UE to the second UE, and including the second feedback message in the feedback message.

Some examples of the method, apparatuses, and non-transitory computer-readable medium described herein may further include operations, features, means, or instructions for receiving, from the base station, an instruction to monitor the third communication link for the second feedback message, an instruction to include the second feedback message in the feedback message, or both.

Some examples of the method, apparatuses, and non-transitory computer-readable medium described herein may further include operations, features, means, or instructions for receiving, from the base station, a downlink control information message indicating configuration information for transmitting the feedback message on the first communication link on a physical uplink channel, the feedback information including an instruction to transmit the feedback message, one or more bits for multiplexing with the feedback message, UE identifiers for one or more additional UEs, codebook size information, codebook type information, or any combination thereof.

Some examples of the method, apparatuses, and non-transitory computer-readable medium described herein may further include operations, features, means, or instructions for aggregating feedback information associated with a set of one or more transmissions from the second UE, the set of one or more transmissions including the sidelink message and generating the feedback message based on the aggregated feedback information.

Some examples of the method, apparatuses, and non-transitory computer-readable medium described herein may further include operations, features, means, or instructions for receiving, from the base station, an indication of a codebook size, determining a size of the feedback message based on the indication of the codebook size and an identifier for the UE, and generating the feedback message according to the determined size.

Some examples of the method, apparatuses, and non-transitory computer-readable medium described herein may further include operations, features, means, or instructions for determining a first type of codebook for the feedback message based on a slot timing indicated via higher layer signaling, a subcarrier spacing associated with the first communication link, a bandwidth part associated with the second communication link, a resource pool bitmap associated with the second communication link, a periodicity of feedback signaling associated with the second communication link, or any combination thereof, where transmitting the feedback message may be based on determining the first type of codebook.

Some examples of the method, apparatuses, and non-transitory computer-readable medium described herein may further include operations, features, means, or instructions for determining a second type of codebook for the feedback message based on a feedback signaling timing for both the first communication link and the second communication link, a time gap indicated in the configuration information, a time domain resource allocation indicated in the configuration information, a sidelink resource pool bitmap, a feedback signaling periodicity on the second communication link, a minimum time gap associated with the second communication link, a service area identifier indicated in the configuration information, or any combination thereof, where transmitting the feedback message may be based on determining the second type of codebook.

Some examples of the method, apparatuses, and non-transitory computer-readable medium described herein may further include operations, features, means, or instructions for receiving, from the second UE, an indication of a codebook for the feedback message, where transmitting the feedback message may be based on receiving the indication of the codebook size.

Some examples of the method, apparatuses, and non-transitory computer-readable medium described herein may further include operations, features, means, or instructions for determining a transmit power associated with the first communication link and a second transmit power associated with the second communication link, comparing the first transmit power and the second transmit power to determine which may be larger, and selecting, for transmitting the feedback message, one of the first transmit power or the second transmit power based on the comparing.

Some examples of the method, apparatuses, and non-transitory computer-readable medium described herein may further include operations, features, means, or instructions for determining one or more sidelink resources from a pool of one or more sidelink resources associated with the second communications link, the second communications link including a sidelink, where the feedback message may be transmitted via the determined one or more sidelink resources.

Some examples of the method, apparatuses, and non-transitory computer-readable medium described herein may further include operations, features, means, or instructions for receiving, from the base station, an indication of the one or more sidelink resources, where determining the one or more sidelink resources may be based on the indication of the one or more sidelink resources.

Some examples of the method, apparatuses, and non-transitory computer-readable medium described herein may further include operations, features, means, or instructions for receiving, from the second UE, an indication of the one or more sidelink resources, where determining the one or more sidelink resources may be based on the indication of the one or more sidelink resources.

Some examples of the method, apparatuses, and non-transitory computer-readable medium described herein may further include operations, features, means, or instructions for identifying a first timing for feedback signaling on the first communication link and a second timing for feedback signaling on the second communication link; identifying a codebook type for the feedback message, and operating in a dual connectivity mode, where the feedback message may be transmitted via both the first communication link according to the first timing and the second communication link according to the second timing and the codebook type.

In some examples of the method, apparatuses, and non-transitory computer-readable medium described herein, the feedback message may be transmitted consecutively on the first communication link and the second communication link, based on the processing capability of the UE.

In some examples of the method, apparatuses, and non-transitory computer-readable medium described herein, the feedback message may be transmitted simultaneously on the first communication link and the second communication link, based on the processing capability of the UE.

A method for wireless communications at a UE is described. The method may include receiving, from a base station via a first communication link, an allocation of resources for communicating with a second UE via a second communications link, transmitting, to the second UE via the second communications link, a sidelink message in accordance with the allocation of resources, and receiving, from the second UE, a feedback message associated with the sidelink message, where the feedback message is multicast to the UE and the base station via one or more of the first communication link, or the second communication link.

An apparatus for wireless communications at a UE is described. The apparatus may include a processor, memory coupled with the processor, and instructions stored in the memory. The instructions may be executable by the processor to cause the apparatus to receive, from a base station via a first communication link, an allocation of resources for communicating with a second UE via a second communications link, transmit, to the second UE via the second communications link, a sidelink message in accordance with the allocation of resources, and receive, from the second UE, a feedback message associated with the sidelink message, where the feedback message is multicast to the UE and the base station via one or more of the first communication link, or the second communication link.

Another apparatus for wireless communications at a UE is described. The apparatus may include means for receiving, from a base station via a first communication link, an allocation of resources for communicating with a second UE via a second communications link, means for transmitting, to the second UE via the second communications link, a sidelink message in accordance with the allocation of resources, and means for receiving, from the second UE, a feedback message associated with the sidelink message, where the feedback message is multicast to the UE and the base station via one or more of the first communication link, or the second communication link.

A non-transitory computer-readable medium storing code for wireless communications at a UE is described. The code may include instructions executable by a processor to receive, from a base station via a first communication link, an allocation of resources for communicating with a second UE via a second communications link, transmit, to the second UE via the second communications link, a sidelink message in accordance with the allocation of resources, and receive, from the second UE, a feedback message associated with the sidelink message, where the feedback message is multicast to the UE and the base station via one or more of the first communication link, or the second communication link.

Some examples of the method, apparatuses, and non-transitory computer-readable medium described herein may further include operations, features, means, or instructions for transmitting, to the second UE, configuration information for the feedback message, the configuration information including an instruction to utilize resource allocated to the UE by the base station for transmitting the feedback message on the first communication link on a physical uplink channel.

Some examples of the method, apparatuses, and non-transitory computer-readable medium described herein may further include operations, features, means, or instructions for receiving, from the base station, transmission configuration information for the feedback message, the transmission configuration information including a time-division multiplexing configuration, a frequency division multiplexing configuration, a single-frequency network configuration, or any combination thereof and transmitting the transmission configuration information not the second UE, where receiving the feedback message may be based on transmitting the configuration information.

Some examples of the method, apparatuses, and non-transitory computer-readable medium described herein may further include operations, features, means, or instructions for selecting the second UE from a set of UEs based on a transmission configuration associated with each UE of the set of UEs, or based on a timing of the feedback message associated with the sidelink message for the second UE, or any combination thereof and transmitting, to the second UE, an instruction to transmit the feedback message to the UE and the base station based on the selecting.

DETAILED DESCRIPTION

Figure 1:
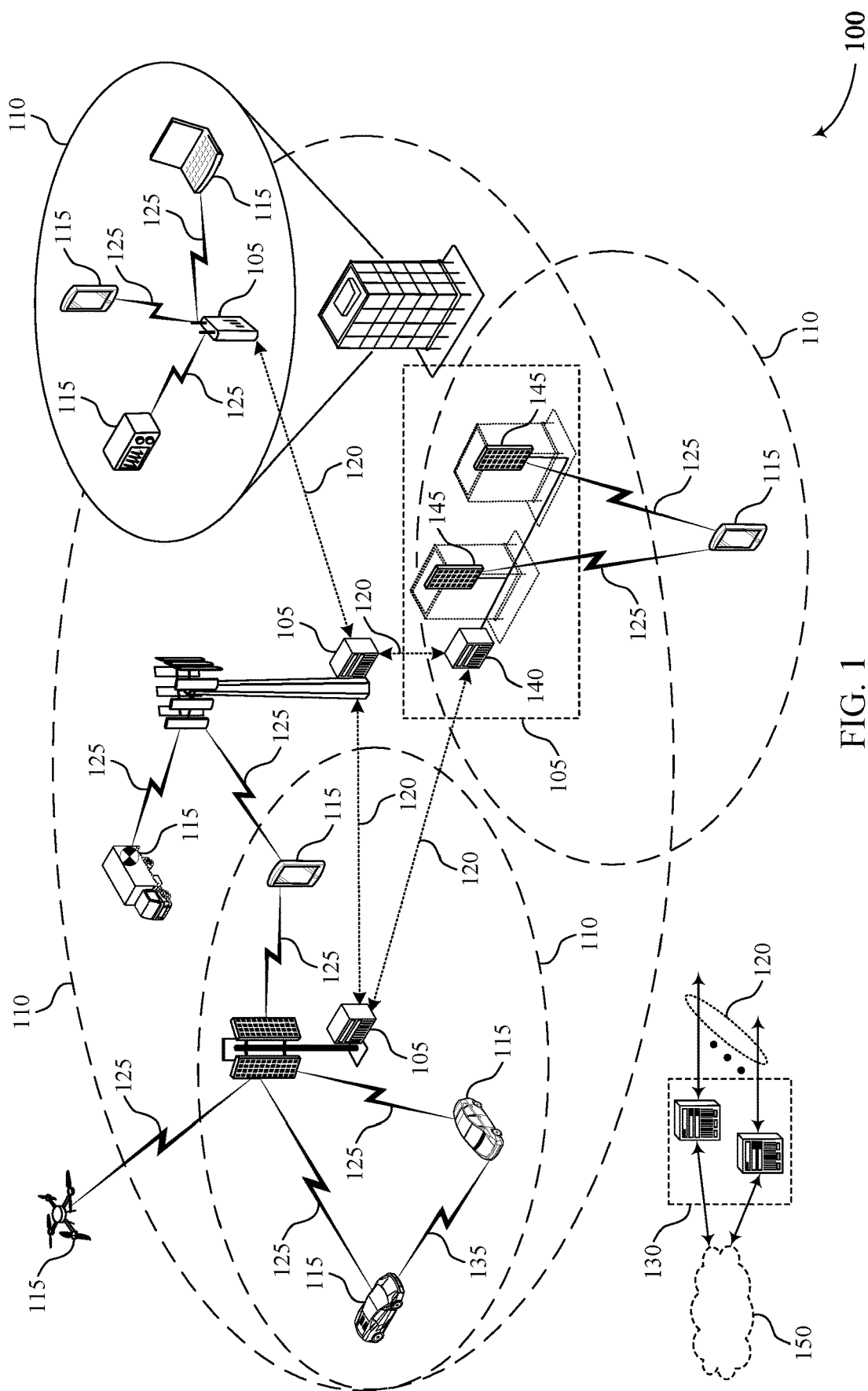
FIG. 1 illustrates an example of a wireless communications system that supports sidelink feedback for multiple transmit receive points in accordance with aspects of the present disclosure.

Some wireless communications systems may support multiple communication links (e.g., a cellular link (which may be referred to as a Uu link) between a base station and one or more user equipments (UEs), and a sidelink (which may be referred to as a PC5 interface) between UEs). In some examples (e.g., in industrial settings), a controller may communicate with a base station via the Uu link, and with one or more UEs (e.g., in an IoT scenario) via the sidelink. In some examples, the base station may configure sidelink resources for communications between sidelink UEs (e.g., operating in a first mode referred to as mode 1). In such examples, the base station may expect to receive feedback information (e.g., a hybrid automatic repeat request (HARQ) acknowledgement (ACK) message or a HARQ negative acknowledgement (NACK) message) related to sidelink communications. For example, a base station may rely on HARQ feedback signaling to allocate subsequent sidelink resource allocation for the sidelink UEs (e.g., to schedule retransmissions, etc.). In some communications systems, a sidelink UE that receives sidelink messages from another sidelink UE (e.g., an sensor or an actuator (SA) controlled by a PLC in an industrial system) may transmit HARQ feedback to the transmitting sidelink UE (e.g., the PLC) The PLC may relay the HARQ feedback to the base station. However, feedback signaling in such scenarios may rely on both the sidelink and the Uu link. If even one of the two links is deficient, experiences high interference, is overloaded or congested, etc., then the signaling will fail even if communications on the other link are reliable. Additionally, a two-hop feedback signal (e.g., transmitted to the PLC on the sidelink in a first hop and relayed to base station on the Uu link in a second hop) may result in increased system latency, increased system delays, decreased system efficiency, and reduced user experience.

In some examples, instead of transmitting feedback signaling via two hops, a UE may transmit feedback signaling for received sidelink messages to both the base station and the transmitting UE. The receiving UE may multicast a feedback message to both the base station and the transmitting UE (e.g., using one or more beams directed to both the base station and the transmitting UE) on a physical uplink control channel (PUCCH) (e.g., on the Uu link). The base station may allocate PUCCH resources to the transmitting UE (e.g., the PLC), and the transmitting UE may delegate the PUCCH resources to the receiving UE. Or, the base station may allocate PUCCH resources directly to the receiving UE, and the receiving UE may utilize the allocated PUCCH resources for transmitting the feedback message. The receiving UE may multicast the feedback message to both the base station and the transmitting UE via the sidelink on a physical sidelink feedback channel (PSFCH). The base station may configure the receiving UE with PSFCH resources, the transmitting UE may allocate PSFCH resources to the receiving UE, or the base station may actively monitor the PSFCH for the feedback message. In some examples, the receiving UE may operate in a dual connectivity mode, and may transmit the feedback message to both the base station and the transmitting UE on both the PUCCH and the PSFCH.

Aspects of the disclosure are initially described in the context of wireless communications systems. Aspects of the disclosure are further illustrated by and described with reference to wireless communications systems and timelines. Aspects of the disclosure are further illustrated by and described with reference to apparatus diagrams, system diagrams, and flowcharts that relate to sidelink feedback for multiple transmit receive points.

FIG. 1 illustrates an example of a wireless communications system 100 that supports sidelink feedback for multiple transmit receive points in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may be a vehicle operating in a vehicle-to-everything (V2X) configuration. The UE 115 may operate in a cellular V2X (C-V2X) scenario. The UE 115 may receive sidelink packets by performing blind decoding on all sidelink sub-channels. A number of sub-channels may be small (e.g., 1-27 subchannels), such that blind decoding all subchannels may be feasible (e.g., without overly increasing processing complexity or utilizing more processing resources than the UE 115 has available). In some examples, the UE 115 may transmit on a physical sidelink control channel (PSCCH) and on a physical sidelink shared channel (PSSCH) in a same transmission time interval (TTI). The PSSCH may occupy a number (e.g., $N_{subchannel}^{SL}$) of contiguous subchannels. The PSCCH can occupy up to one subchannel with the lowest subchannel index. A first stage SCI may be transmitted in PSCCH containing information about PSSCH bandwidth and resource reservations in future slots. A second stage SCI may be found and decoded after decoding the PSCCH, a source identifier and destination identifier may be used to distinguish whether the packet is for the UE 115 and from which UE 115 the packet is received. In some examples, the subchannel size in V2X may be large (e.g., at least 10 resource blocks (RBs)). C-V2X systems may support UE 115 in decoding all transmissions and may rely on blind decoding of all subchannels.

In some examples, a UE 115 (e.g., a C-V2X device) may receive SCI having a first format (1_1) on a PSCCH. Frequency domain resource allocation (FDRA) may be defined as $$\left\lceil \log \frac{N_{subchannel}^{SL}\left(N_{subchannel}^{SL}+1\right)}{2} \right\rceil$$

bits for 2 reservations, $$\left\lceil \log \frac{N_{subchannel}^{SL}(N_{subchannel}^{SL}+1)(2N_{subchannel}^{SL}+1)}{6} \right\rceil$$

bits for 3 reservations, etc. Time domain reserve allocation (TDRA) may be defined as 5 bits for 2 reservations, 9 bits for 3 reservations, etc.

PSCCH may be preconfigured to occupy a number of PRBs (e.g., 10, 12, 15, 20, 25, etc.). A PSCCH may be limited to a single sub-channel. PSCCH duration may be preconfigured to span a number (e.g., 2, 3, etc.) of symbols. A sub-channel may occupy a number (e.g., 10, 115, 20, 25, 50, 75, 100, etc.) PRBs. A number of subchannels may be 1-27 in a resource pool (RP). A PSCCH size may be fixed for a resource pool (e.g., from 10% to 100% of a subchannel (e.g., in a first 2 or 3 symbols) depending on the configuration. A PSSCH may occupy at least 1 subchannel and may contain a second stage sidelink control information (SCI).

In some examples, a UE 115 (e.g., a C-V2X device) may operate in a first mode (mode 1) or a second mode (mode 2). When operating in mode 1, a base station 105 may assign transmission resources for sidelink communications (e.g., via a DCI with format 3_0). When operating in mode 2, a transmitting UE 115 may autonomously determine resources for sidelink communications. A receiving sidelink UE 115 may operate in the same manner in mode 1 or mode 2. Mode 1 operations may support dynamic grants (DGs), configured grants (CGs) type 1, and CG type 2. A CG type 1 may be activated via RRC signaling from a base station 105. A base station 105 may transmit a DCI format 3_0 to allocate time and frequency resources, to indicate transmissions timing, etc. MCS for a UE 115 may be set up within a limit set by a base station 105. Mode 2 may support a transmitting UE 115 that performs channel sensing by blindly decoding all PSCCH channels and finding resources reserved by other sidelink transmissions. A transmitting UE 115 may report available resources to upper layers and upper layers may determine resource usage.

In some examples, a UE 115 may operate in an industrial IoT (IIoT) deployment. Sidelink communications may enable direct programmable logical controller (PLC) and sensor/actuators (SAs) communications. Wireless PLC may support flexible, and simple deployments. PLC may control a number of SAs (e.g., 20-50 SAs). PLC and SA sidelink communications may support tight latency restrictions (e.g., 1-2 ms) and ultra reliability requirements (e.g., an error rate of $10^{-6}$). Communications through a base station 105 may rely on multiple OTAs, which may affect latency and reliability. IIoT traffic may be deterministic with a small packet size (e.g., 32-256 Bytes). Bandwidths may therefore be low (e.g., 2 Bs) in some cases. SAs may have some constraints on UE capability in terms of bandwidth and processing power. In some examples, overall bandwidth may be large for IIoT with dedicated frequency bands and/or unlicensed bands. SAs may not rely on detecting or monitoring all transmissions. A PSCCH for an IIoT may meet stringent IIoT requirements. Challenging radio frequency environments may result in blockages and interference.

In some examples, sidelink UEs may transmit control signaling on a PSCCH, including sidelink control information (SCI). SCIs (e.g., with format 1-A) may include priority 3 bits, a frequency resources assignment (e.g., where the bits depend on a number of slot reservations, a number of subchannels, or both), a time resource assignment (e.g., 5 or 9 bits for 2 or 3 reservations), a resource reservation period (e.g., the bits depending on a number of allowed periods), a DMRS pattern (e.g., the bits depending on a number of configured patterns), or any combination thereof. SCIs may correspond to a format (e.g., 2 bits for indicating an SCI format). In some examples, an SCI may include a Beta offset for SCI 2 rate matching (e.g., 2 bits), a DMRS port (e.g., 1 bit indicating one or more data layers), an MCS indication (e.g., 5 bits), a PSFCH overhead indicator (e.g., 0 or 1 bit), one or more reserved bits (e.g., bits up to upper layers), or any combination thereof. In some examples, an intended receiving sidelink UE 115, other sidelink UEs (e.g., operating in mode 2), or both, may decode sidelink messages (e.g., to allow channel sensing, avoid resource collision, etc.).

In some examples, an SCI (e.g., SCI format 2) on a PSSCH may be front-loaded. Such an SCI may include a HARQ ID (e.g., bits depending on a number of HARQ processes), an NDI (e.g., 1 bit), an RV-ID (e.g., 2 bits), a source identifier (e.g., 8 bits), a destination identifier (e.g., 16 bits), a HARQ enable or disable message (e.g., 1 bit), or any combination thereof. In some examples, an SCI (e.g., an SCI 2-A) may include fields such as a cast type field (e.g., 2 bits, indicating broadcast, groupcast, unicast, CSI request (e.g., 1 bit), or the like). In some examples, an SCI (e.g., an SCI 2-B) may include NACK-only groupcast fields, zone identifier field (e.g., 12 bits), a communication range (e.g., 4 bits), or the like. An SCI 2 may be intended for receiving UEs 115 for decoding a PSSCH.

In some examples, a base station 105 may transmit downlink control information (e.g., DCI format 3_0) for NR sidelink. A DCI format 3_0 may include a resource pool index (e.g., bits depending on a number of resource pools as indicated by a higher layer parameter such as sl-Tx-PoolScheduling), a time gap (e.g., 3 bits as indicate by a higher layer parameter such as sil-DCI-ToSL-Trans), a HARQ process number (e.g., 4 bits), an NDI (e.g., 1 bit), lowest subcarrier index for the allocation, one or more SC-1-A format specific fields (e.g., TDRA field, FDRA field, or the like), a PSFCH to HARQ feedback timing (e.g., as indicated by a higher layer parameter such as sl-PSFCH-ToPUCCH), a PUCCH resource indicator (e.g., 3 bits), a configuration index (e.g., 0 bits if DG-only monitoring, 3 bits otherwise), or any combination thereof. In some examples, HARQ reports may be transmitted on a Uu link.

In some examples, a UE 115 may transmit feedback signaling for received sidelink messages to both a base station 105 and the transmitting UE 115. The receiving UE may multicast a feedback message to both the base station and the transmitting UE 115 (e.g., using one or more beams directed to both the base station and the transmitting UE 115) on a physical uplink control channel (PUCCH) (e.g., on the Uu link). The base station may allocate PUCCH resources to the transmitting UE (e.g., the PLC), and the transmitting UE may delegate the PUCCH resources to the receiving UE 115. Or, the base station may allocate PUCCH resources directly to the transmitting UE, and the transmitting UE 115 may utilize the allocated PUCCH resources for transmitting the feedback message. The receiving UE 115 may multicast the feedback message to both the base station and the transmitting UE 115 via the sidelink on a physical sidelink feedback channel (PSFCH). The base station may configure the receiving UE 115 PSFCH resources, the transmitting UE 115 may allocate PSFCH resources to the receiving UE 115, or the base station may actively monitor the PSFCH for the feedback message. In some examples, the receiving UE 115 may operate in a dual connectivity mode, and may transmit the feedback message to both the base station and the transmitting UE 115 on both the PUCCH and the PSFCH.

Figure 2:
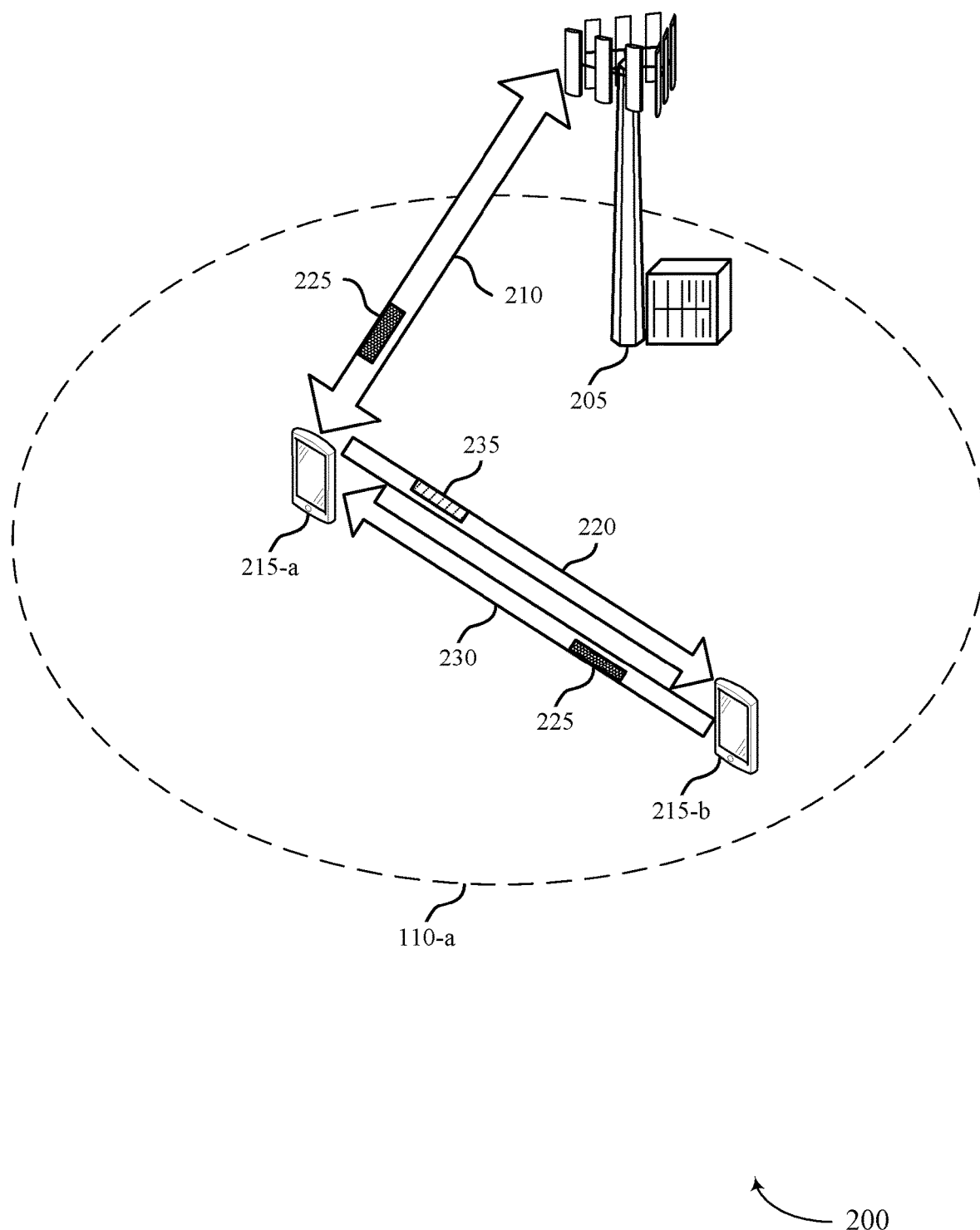
FIG. 2 illustrates an example of a wireless communications system that supports sidelink feedback for multiple transmit receive points in accordance with aspects of the present disclosure.

FIG. 2 illustrates an example of a wireless communications system 200 that supports sidelink feedback for multiple transmit receive points in accordance with aspects of the present disclosure. In some examples, wireless communications system 200 may include a base station 205, a UE 215-*a,* UE 215-*b,* or the like, which may be examples of corresponding devices described with reference to FIG. 1. Base station 205 may communicate with one or more devices (e.g., UEs 215) located with a coverage area 110-*a*. In some examples, UEs 215 may communicate with each other (e.g., via one or more sidelink channels). For example, UEs 215 may be sidelink UEs. In some examples, UE 215-*a* may transmit signaling (e.g., a sidelink message 235) to UE 215-*b* (e.g., via a sidelink channel, such as a PSSCH 220).

In some examples, UEs 215 may operate in an industrial setting. For example, UE 215-*a* may be a PLC, and UE 215-*b* may be an example of an SA. For example, UEs 215 may operate in an IIoT deployment. Sidelink communications may enable direct PLC and SA communications (e.g., between UE 215-*a* and UE 215-*b*). Wireless PLCs may support flexible, and simple deployments. A PLC (e.g., UE 215-*a*) may control a number of SAs (e.g., 20-50 SAs including UE 215-*b*). PLC and SA sidelink communications may support tight latency restrictions (e.g., 1-2 ms) and ultra-reliability requirements (e.g., satisfying an error rate of $10^{-6}$). Communications through a base station 205 may rely on multiple OTAs, which may affect latency and reliability. IIoT traffic may be deterministic with a small packet size (e.g., 32-256 Bytes).

UEs 215 may operate in one or more modes. For example, in mode 2, UEs 215 may autonomously determine sidelink resources on which to communicate. In such examples, UE 215-*b* may transmit the feedback message 225 to UE 215-*a* on a sidelink channel (e.g., on PSFCH 230).

In some examples, UEs 215 may perform multi-hop or multi-stage feedback signaling. For example, when operating in mode 1, base station 205 may identify, assign, or otherwise coordinate sidelink resources for sidelink communications between UEs 215. In such examples, UE 215-*a* may transmit a sidelink message 235 to UE 215-*b* on PSSCH 220. UE 215-*b,* upon attempting to receive the sidelink message 235, may generate a feedback message 225 (e.g., a hybrid automatic repeat request (HARQ) acknowledgement (ACK) message or a HARQ negative acknowledgement (NACK) message). UE 215-*b* may transmit feedback message 225 to UE 215-*a* on a sidelink channel (e.g., PSFCH 230). As base station 205 may rely on feedback signaling for sidelink communications to coordinate sidelink resources for sidelink UEs 215, UE 215-*a* may forward the sidelink message 235 to base station 205 (e.g., via a physical uplink control channel (PUCCH) 210 on a Uu link).

In some examples, multi-hop feedback signaling may not be reliable. For example, successful multi-hop feedback signaling may be unsuccessful if either the sidelink (e.g., PSFCH 230) or the Uu link (e.g., PUCCH 210) suffer interference, reduced channel quality, or the like. In some examples, base station 205 may configure mode 1 sidelink communications via a DCI having format 3_0. In such examples, a scheduling DCI may not include any indication of PUCCH resources on which to forward feedback message 225. In some examples, PSFCH 230 may be disabled, in which case UE 215-*a* may not receive the feedback message 225 (e.g., and may therefore not be able to forward the feedback message 225 to base station 205). In some examples, type 1 or type 2 codebook for feedback message 225 may or may not be enabled via a PUCCH or PUSCH. Additionally, multi-hop feedback signaling may result in increased latency. For example, UE 215-*a* may monitor PSFCH 230 for the feedback message 225. UE 215-*a* may take some amount of time to decode the feedback message 225. UE 215-*a* may, in some examples, also generate a copy of the feedback message 225 for transmission, or may prepare the received packet or packets of the received feedback message 225 for forwarding to base station 205 via the PUCCH 210. This may also take some amount of time. Then, UE 215-*a* may transmit the feedback message 225 to base station 205, and base station 205 may take some amount of time for monitoring, receiving, and decoding the feedback message. Each step of the multi-hop feedback signaling may take some time, even if each leg of the multi-hop feedback signaling is successful, resulting in increased system delays, decreased signaling reliability, inability to satisfy URLLC timing constraints, reduced user experience, and the like.

In some examples, UE 215-*b* may transmit feedback message 225 to both base station 205 and UE 215-*a*. For example, as described in greater detail with reference to FIGS. 3-5, UE 215-*b* may multicast feedback message 225 to base station 205 and UE 215-*a* (e.g., via a PUCCH). In some examples, as described in greater detail with reference to FIG. 6, UE 215-*b* may multicast feedback message 225 to base station 205 and UE 215-*a* via a sidelink channel (e.g., PSFCH 230). In some examples, as described in greater detail with reference to FIGS. 7-8, UE 215-*b* may transmit feedback message 225 to both base station 205 and UE 215-*a* via both a Uu link (e.g., a PUCCH 210 and a PSFCH 230) in a dual connectivity mode.

Figure 3:
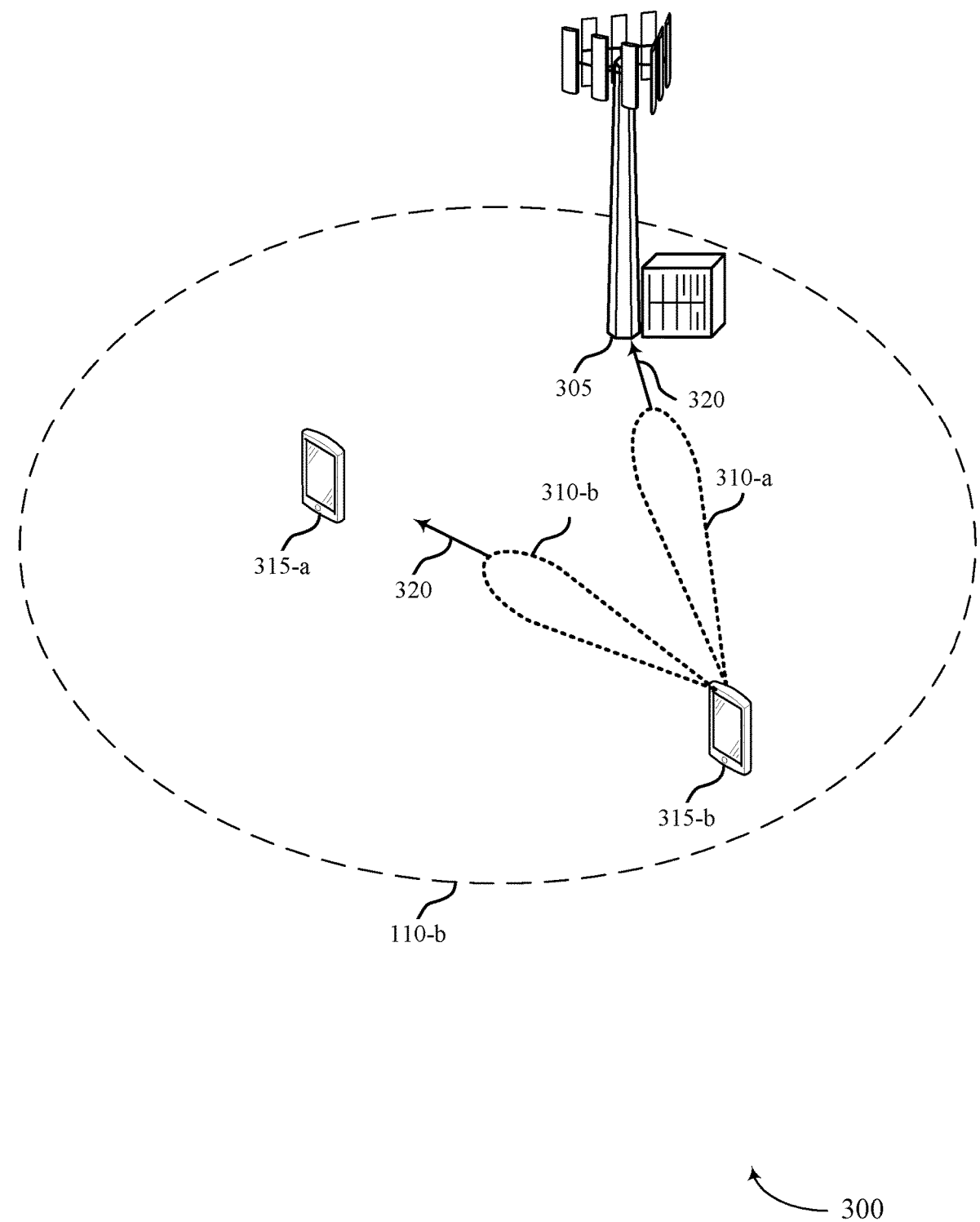
FIG. 3 illustrates an example of a wireless communications system that supports sidelink feedback for multiple transmit receive points in accordance with aspects of the present disclosure.

FIG. 3 illustrates an example of a wireless communications system 300 that supports sidelink feedback for multiple transmit receive points in accordance with aspects of the present disclosure. Wireless communications system 300 may include a base station 305, a UE 315-*a,* and a UE 315-*b,* which may be examples of corresponding devices described with reference to FIGS. 1 and 2. For example, UE 315-*a* and UE 315-*b* may be examples of sidelink UEs (e.g., UE 315-*a* may be a PLC and UE 315-*b* may be an SA).

In some examples, UE 315-*b* may multicast feedback signaling to both base station 305 and UE 315-*a*. For example, UE 315-*b* may receive a sidelink message from UE 315-*a*. Instead of transmitting a multi-hop feedback message to base station 305 via UE 315-*a* (e.g., as described with reference to FIG. 2), UE 315-*b* may multicast feedback message 320 to both base station 305 and UE 315-*a* (e.g., via a physical uplink channel such as a PUCCH). UE 315-*b* may transmit feedback message 320 (e.g., on a PUCCH), via a single beam 310, or via two separate beams 310-*a* and 310-*b*. UE 315-*b* may transmit feedback message 320 on beam 310-*a* (e.g., trained in the direction of base station 305) and on beam 310-*b* (e.g., trained in the direction of UE 315-*a*) simultaneously, or one after the other. In some examples, UE 315-*b* may transmit feedback message 320 on a PUCCH. In such examples, base station 305 may monitor the PUCCH resources (e.g., as allocated to UE 315-*a*), and may receive the feedback message 320. Similarly, UE 315-*a* may monitor the PUCCH resources, and may receive the feedback message 320. In some examples, UE 315-*b* may transmit the feedback message 320 on the PUCCH via beam 310-*a,* and may transmit the feedback message 320 on a PSFCH via beam 310-*b*.

In some examples, UE 315-*a* may delegate HARQ signaling (e.g., feedback resources on the PUCCH) to UE 315-*b*. For example, in mode 1, base station 305 may configure sidelink resources for the sidelink message, and may also allocate (e.g., to UE 315-*a*), PUCCH resources on which to transmit feedback message 320. Base station 305 may schedule the sidelink message, PUCCH resources for feedback message 320, or both, in a DCI message (e.g., DCI format 3_0). In some examples, UE 315-*a* may delegate the allocated PUCCH resources for feedback message 320 to UE 315-*b*. UE 315-*a* may relay (e.g., to UE 315-*b* on a sidelink channel such as a PSCCH or a PSSCH) any information needed by UE 315-*b* to transmit feedback message 320 on the PUCCH. For example, UE 315-*a* may provide, to UE 315-*b*, PUCCH resource indicator (PRI), HARQ codebook type for the feedback message 320, other HARQ bits (e.g., for the Uu link or for the sidelink) to be multiplexed with feedback message 320, or any combination thereof. In some examples, as described in greater detail with reference to FIG. 5, UE 315-*a* may select UE 315-*b* from a set of sidelink UEs 315 for transmitting the feedback message 320 (e.g., which may include feedback information from other sidelink UEs, from UE 315-*a* for the Uu link, or any combination thereof). In some examples, scenarios in which UE 315-*a* delegates PUCCH resources to UE 315-*b* for feedback message 320 may be referred to as case 1.

In some examples (e.g., case 1), UE 315-*b* may signal its capability for supporting multi-cast HARQ signaling. For example, UE 315-*b* may transmit (e.g., via a broadcast channel, a sidelink channel, a Uu link, or any combination thereof) an indication of its transmit power (e.g., whether its transmit power is adequate for a joint transmission/multi-cast), spatial information (e.g., an indication of whether spatial information is available or adequate for a joint PC5 and Uu transmission), a type of transmission (e.g., TDM, FDM, SFN, or the like), or any combination thereof.

In some examples (e.g., case 1), base station 305 and UE 315-*a* may exchange signaling in preparation for joint feedback signaling (e.g., the multicast feedback message 320). For instance, base station 305 may configure UE 315-*a* with an indication of a transmission type (e.g., TDM, FDM, SFN, related resource configurations, or the like). In some examples, base station 305 may transmit a downlink signal to UE 315-*a* indicating transmission configurations (e.g., for UE 315-*b*, and one or more other UEs 315). The downlink signal may be a DCI message (e.g., a DCI format 3_0), a media access control (MAC) control element (CE), an RRC message, or any combination thereof. In some examples, UE 315-*a* may select UE 315-*b* (e.g., from a set of served sidelink UEs 315) to transmit the feedback message 320 based on the transmission configuration of UE 315-*b*, the transmission configuration of UE 315-*a*, or both (e.g., as indicated by base station 305 via the downlink signal).

In some examples (e.g., case 1), UE 315-*a* (e.g., a PLC) may inform UE 315-*b* (e.g., an SA) of PUCCH resource selection. UE 315-*a* may indicate specific PUCCH resources for UE 315-*b* to use for transmitting the feedback message 320, or UE 315-*a* may provide information on which UE 315-*b* may rely in selecting resources on which to transmit the feedback message 320. UE 315-*a* may indicate PUCCH resources on which UE 315-*b* is to transmit the feedback message 320 via an SCI message (e.g., SCI-2), upper layer signaling (e.g., RRC signaling), or both. In some examples, base station 305 may indicate (e.g., via a DCI format 3_0) PLC, one or more PUCCH resources, or the like. UE 315-*a* may calculate PUCCH resources based on PRI, CCE index, or the like (e.g., as indicated in the DCI format 3_0) to determine one or more PUCCH resources from a set of PUCCH resources. In such examples, UE 315-*a* may transmit the adjusted PRI to UE 315-*b*. A PUCCH resources set (e.g., from which UE 315-*a* may select the one or more PUCCH resources) may be configured by base station 305 via higher layer signaling (e.g., an RRC parameter such as a pucch-Resource Common parameter). In some examples, base station 305 may configure up to a number (e.g., four) of PUCCH resource sets via higher layer signaling (e.g., via RRC parameters such as a PUCCH-Config parameter). In some examples, base station 305 may configure UE 315-*a* with frequency hopping information, group hopping information, a hopping identifier (e.g., hoppingID), or other related information for the PUCCH resources (e.g., via higher layer signaling such as a PUCCH-ConfigCommon parameter, a PUCCH-Config parameter, or the like). UE 315-*a* may utilize such information to select one or more PUCCH resources, or may forward such information to UE 315-*b* so that UE 315-*b* may select PUCCH resources for transmitting the feedback message 320.

In some examples, base station 305 may provide additional PUCCH information, which UE 315-*a* may provide to UE 315-*b*. For example, base station 305 may provide bandwidth part (BWP) configuration information to UE 315-*a* for UE 315-*a*, UE 315-*b*, or both. Base station 305 may provide a power control command (e.g., for transmitting feedback message 320) to UE 315-*a*. UE 315-*a* may use such information in configuring PUCCH resources on which to transmit feedback message 320 (e.g., which UE 315-*a* may provide to UE 315-*b*), or UE 315-*a* may forward such information directly to UE 315-*b*.

In some examples, UE 315-*a* may receive one or more codebook determination parameters from base station 305, and may relay the codebook determination parameters to UE 315-*b*. For example, UE 315-*a* may receive, and relay to UE 315-*b*, a sidelink assignment index (SAI), an indication of type 1 codebook or type 2 codebook, one or more higher layer parameters (e.g., as indicated in an RRC parameter such as pdsch-HARQ-ACK-Codebook), or any combination thereof.

In some examples, base station 305 may configure UE 315-*b* to multicast the feedback message 320. For example, base station 305 may allocate sidelink resources for a sidelink message, and a corresponding feedback message 320 (e.g., via DCI signaling). The DCIs scheduling the feedback message 320 may be an enhanced DCI. The DCI messages may indicate PRI associated with the feedback message 320 to UE 315-*a*, UE 315-*b*, or both. In some examples, base station 305 may instruct UE 315-*a* to transmit the feedback message 320 (e.g., as described with reference to FIG. 2). In some examples, base station 305 may instruct UE 315-*b* to transmit the feedback message 320 (e.g., via an enhanced DCI message). The enhanced DCI message may further provide transmission configuration information for the joint transmission (e.g., on the Uu link, the PC5 link, or both). In some examples, scenarios in which base station 305 configures UE 315-*b* to multicast the feedback message 320 (e.g., on the PUCCH), may be referred to as case 2.

In the case of configured grants, UE 315-*a* may provide additional PUCCH information to UE 315-*b* (e.g., RRC parameter sl-N1PUCCH-AN-r16).

In some cases, UE 315-*b* may determine a codebook type for feedback message 320. For example, base station may configure a set of slot timing (e.g., K1) via higher layer signaling (e.g., RRC parameters such as sl-PSFCH-To-PUCCH or sl-PSFCH-ToPUCCH-CG-Type1). Base station 305 may configure the slot timing directly to UE 315-*b* (e.g., all sidelink UEs 315 within coverage area 110-*b*), or may provide the slot timing to UE 315-a, and UE 315-a may provide the slot timing to UE 315-b (e.g., via sidelink communications). UE 315-b may determine a codebook (e.g., a HARQ codebook payload size, an order of each ACK or NACK bit, or the like) for a codebook type (e.g., type 1) based on the configured slot timing (e.g., a codebook type may be associated with the slot timings, or may be indicated by the RRC parameters that configure the slot timing). In some examples, UE 315-b may determine HARQ codebook (e.g., a HARQ codebook payload size, an order of each ACK or NACK bit, or the like) for a codebook type (e.g., type 1) based on a subcarrier spacing on the uplink (e.g., the Uu link), a sidelink BWP, or both. That is, the contents of a HARQ codebook may be determined based on the subcarrier spacing, BWP, or the like, for an indicated codebook type. In some examples, a sidelink resource pool bitmap (e.g., configured by base station 305 or relayed by UE 315-a) may indicate a codebook type for the feedback message 320. In some examples, UE 315-b may determine a codebook type, codebook contents, or both, based on a PSFCH periodicity. The contents and payload sizes of different HARQ codebooks may thus be different (e.g., based on different parameter values, codebook types, or the like).

In some examples, UE 315-a may indicate a codebook type for multicasting the feedback message 320. For example, UE 315-a may instruct UE 315-b to use type 1 codebook transmissions for the feedback message 320. UE 315-a may transmit such an instruction via a SCI message, a MAC-CE, an RRC message, or the like. Upon receiving such an instruction, UE 315-b may transmit the feedback message 320 and any subsequent feedback messages until instructed otherwise by UE 315-a.

In some examples, UE 315-b may generate a feedback message (e.g., a HARQ ACK) for each candidate PSSCH transmission for all of a time period (e.g., K1) without a corresponding DCI scheduling the PSSCH transmission. In some examples, UE 315-a may generate some HARQ bits which correspond to DCIs scheduling the transmission, and may provide them to UE 315-b for transmission with or in feedback message 320. In some examples, UE 315-b may generate a feedback message (e.g., a HARQ ACK) based on one or more parameters provided by UE 315-a, along with HARQ feedback for the PSFCH. For instance, this may occur in cases where UE 315-a transmits to a single UE 315 (e.g., UE 315-b) during a time period (e.g., K1). Thus, if feedback message 320 is a type 1 feedback message, feedback message 320 may include generated HARQ bits to candidate transmissions even without a DCI scheduling the transmission. If feedback message 320 is a type 2 feedback message, then feedback message 320 may only generate HARQ bits for scheduled transmissions. Thus, a type 2 feedback message 320 may have a smaller payload size, while a type 1 feedback message may be more robust to missed DCI detection.

In some cases, UE 315-b may determine a codebook (e.g., a HARQ codebook payload size, an order of each ACK or NACK bit, or the like) for a codebook type (e.g., type 2) for feedback message 320 based on one or more parameters or indications. For instance, bac station 305 or UE 315-a may determine a codebook type (e.g., type 2), and may indicate the codebook type to UE 315-b. UE 315-b may determine a payload size and content for a HARQ transmission (e.g., feedback message 320) for the indicated codebook type (e.g., type 2) based on feedback timing (e.g., PSFCH-to-HARQ feedback timing), based on a higher layer parameter (e.g., RRC parameter sl-ACKToUL-ACK), or the like. In some examples, UE 315-b may determine payload size and content of the feedback message 320 (e.g., for type 2 codebook) based on a time gap field, a TDRA field, or the like, included in a DCI format 3_0 received from base station 305 or relayed by UE 315-a. UE 315-b may select a codebook type based on a sidelink resource pool bitmap, a PSFCH periodicity, a minimum time gap for the PSFCH, or an SAI included in a DCI format 3_0, or any combination thereof. Thus, if feedback message 320 is a type 1 feedback message, feedback message 320 may include generated HARQ bits to candidate transmissions even without a DCI scheduling the transmission. If feedback message 320 is a type 2 feedback message, then feedback message 320 may only generate HARQ bits for scheduled transmissions. Thus, a type 2 feedback message 320 may have a smaller payload size, while a type 1 feedback message may be more robust to missed DCI detection.

In some examples, UE 315-a may instruct UE 315-b to transmit the feedback message 320 using a particular codebook type (e.g., type 2). In such examples, UE 315-b may generate feedback information (e.g., HARQ ACK) for each scheduled PSSCH transmission. UE 315-b may generate HARQ-ACK based on the parameters provided by UE 315-a or base station 305, s described herein, in combination with its own HARQ-ACK for the PSFCH. In some examples, UE 315-a may indicate, to UE 315-b, a total SAI and counter SAI for codebook generation. For example, UE 315-a may indicate, to UE 315-b via a SCI message (e.g., SCI-1 or SCI-2) or RRC signaling, a total SAI and a counter SAI. In some examples, UE 315-b may use the total SAI and the counter SAI for determining the payload size for the HARQ codebook (e.g., a type 2 HARQ codebook). In some examples, base station 305 may provide a total SAI and counter SAI to UE 315-b. In such examples, UE 315-b may use the total SAI and the counter SAI for determining the payload size for the HARQ codebook (e.g., a type 2 HARQ codebook).

In some examples, UE 315-b may determine power control parameters for transmitting the feedback message 320, compensating for both sidelink and Uu pathloss. In some examples, UE 315-a may determine a transmit power configured for the sidelink, and a transmit power configured for the Uu link, and may select one of the two transmit powers. For example, UE 315-b may select the largest of the two determined transmit powers, and may multicast the feedback message 320 according to the largest transmit power. In some examples, UE 315-b may utilize channel state information (CSI) for both the Uu link and the sidelink. For example, based on CSI for both links, UE 315-b may perform beam forming, pre-coding, or both, toward one or both of the sidelink and the Uu link. In some examples, UE 315-b may select a transmit power for the feedback message 320 based on TDM, FDM, or SFN instruction provided by base station 305, relayed from base station 305 to UE 315-b by UE 315-a, or provided directly by UE 315-a.

In some examples, both base station 305 and UE 315-a may monitor the PUCCH to receive the feedback message 320. Base station 305, UE 315-a, or both, may trigger a retransmission if the feedback message 320 includes a NACK message. For example, UE 315-a may receive the NACK message and may request retransmission resources from base station 305 (e.g., resources on which to retransmit the sidelink message associated with the NACK message). In some examples, UE 315-a may use preassigned resources on which to retransmit the sidelink message. In some examples, the feedback message 320 (e.g., the NACK message) may include an indication of a preferred retransmission path. For instance, the feedback message 320 may request the retransmission from UE 315-*a*, or a direct transmission from base station 305. Upon receiving the NACK message, base station 305 may schedule a retransmission on the sidelink (e.g., directly or via UE 315-*a*), or via the Uu link, or both (e.g., depending on channel conditions, UE preference, or the like).

In some examples, UE 315-*a* may provide multiplexing information to UE 315-*b*. For example, wireless communications system 300 may support multiplexing of sidelink HARQ signaling with Uu HARQ signaling, scheduling requests (SRs), CSI signaling, or the like. In such examples, UE 315-*a* may provide information that is to be multiplexed with feedback message 320 to UE 315-*b*. For instance, UE 315-*a* may generate HARQ bits for the Uu link between UE 315-*a* and base station 305, a SR, CSI associated with a sidelink or the Uu link or both, or any combination thereof. UE 315-*a* may transmit this information to UE 315-*b* (e.g., via a PSSCH or a PSCCH). In some examples, UE 315-*a* may transmit such multiplexing information to UE 315-*b* together with or separate from an instruction to transmit feedback message 320 to base station 305 (e.g., on a PUCCH). Upon receiving such information, UE 315-*b* may multiplex such information with feedback message 320. UE 315-*b* may multiplex such information using TDM, FDM, SDM, or any combination thereof. In some examples, UE 315-*b* may include the multiplexing information in feedback message 320.

In some examples, as described with reference to FIG. 4, a sidelink transmission may be dropped, and a UE 315-*a* may determine how to proceed with respect to feedback signaling.

Figure 4:
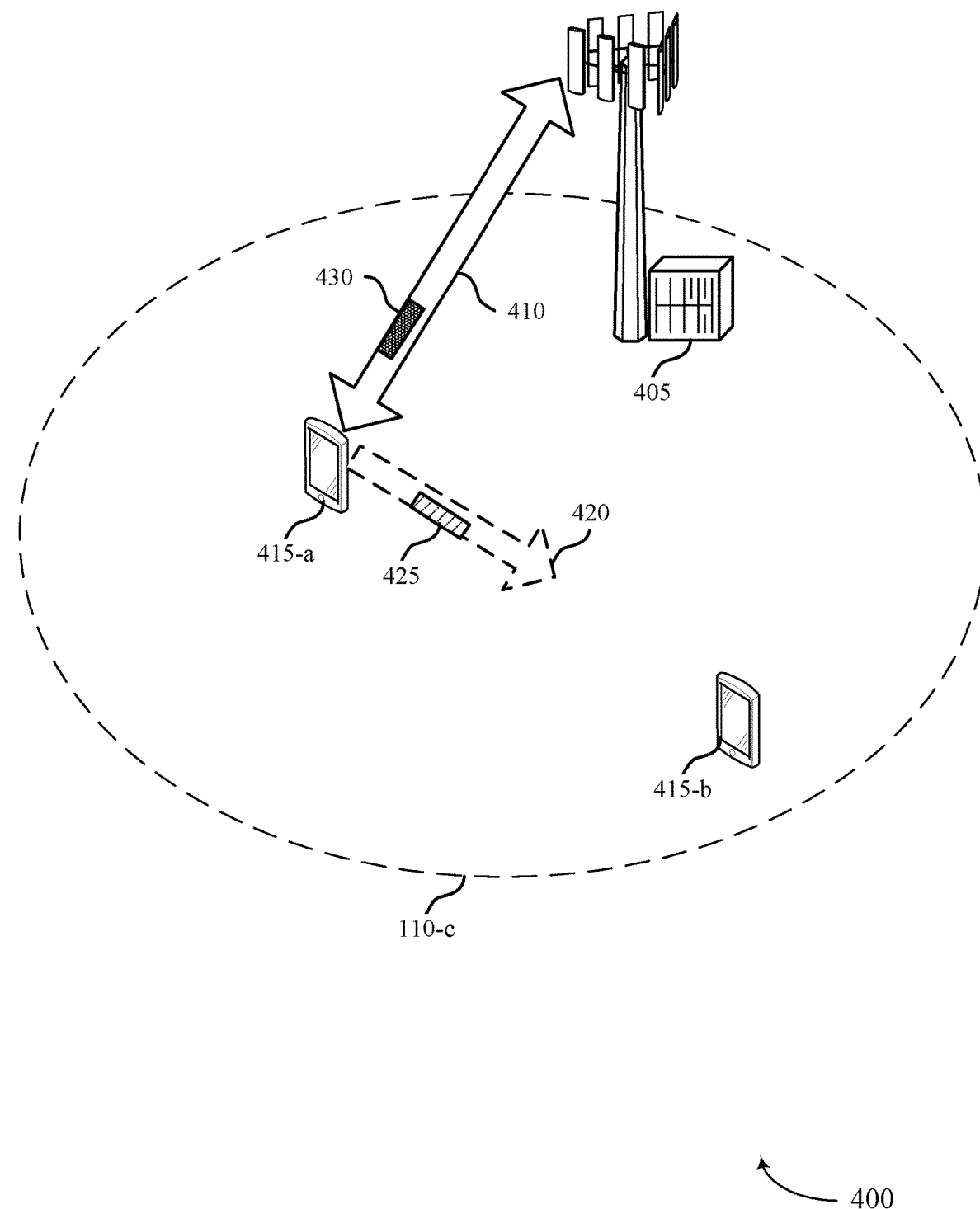
FIG. 4 illustrates an example of a wireless communications system that supports sidelink feedback for multiple transmit receive points in accordance with aspects of the present disclosure.

FIG. 4 illustrates an example of a wireless communications system 400 that supports sidelink feedback for multiple transmit receive points in accordance with aspects of the present disclosure. Wireless communications system 400 may include a base station 405, a UE 415-*a*, and a UE 415-*b*, which may be examples of corresponding devices described with reference to FIGS. 1-3. For example, wireless communications system 400 may be an example of an IIoT, UE 415-*a* may be an example of a PLC, and UE 415-*b* may be an example of an SA. UE 415-*a* and UE 415-*b* may communicate via one or more sidelink channels (e.g., a PC5 link) in mode 1.

In some examples, UE 415-*a* may drop one or more sidelink messages 425. For instance, UE 415-*a* may drop one transmission or a number of transmissions due to prioritization. For example, UE 415-*a* may refrain from transmitting sidelink message 425 if other, higher priority, transmissions or receptions of sidelink or Uu traffic are scheduled and transmitted instead (e.g., transmission or reception of SSB or S-SSB). In some examples, UE 415-*a* may attempt to transmit a sidelink message 425 to UE 415-*b* (e.g., via a sidelink channel such as PSSCH 420), but the sidelink transmission may fail, or the sidelink message 425 may be dropped, or the like. UE 415-*b* may thus not successfully receive the sidelink message 425. In some cases, UE 415-*b* may not be aware that sidelink message 425 was scheduled, or dropped, or both. In such examples, UE 415-*a* may determine which device is to transmit the feedback message 430 (e.g., on a PUCCH 410). In some examples, UE 415-*a* may determine to transmit the feedback message 430. In such examples, UE 415-*a* may transmit the feedback message 430 on PUCCH 410 (e.g., using PUCCH resources indicated by base station 405 in a DCI message). In some examples, UE 415-*a* may generate the HARQ bits of feedback message 430, and may provide them to UE 415-*b* (e.g., via PSSCH 420, or via a PSCCH or PSFCH).

For instance, UE 415-*a* may generate an ACK message or a NACK message, and may provide the bits of the ACK or NACK message to UE 415-*b*. In such examples (e.g., despite not having received or not having been aware of sidelink message 425), UE 415-*b* may transmit the feedback message 430 to base station 405 (e.g., may relay, to base station 405, the HARQ bits provided to UE 415-*b* by UE 415-*a*).

In some cases, UE 415-*a* may determine to transmit the feedback message 430, or may instruct UE 415-*b* to transmit the feedback message 430, based on one or more parameters or conditions. For example, UE 415-*a* may determine whether to transmit the feedback message 430 itself, or to instruct UE 415-*b* to transmit the feedback message on the PUCCH based on timing of one or more sidelink transmissions to one or more sidelink UEs (e.g., based on an order of sidelink or feedback transmissions or a number of sidelink UEs 415 (e.g., SAs) communicating during a reporting period). For example, if UE 415-*a* is communicating with more than one UE 415 (e.g., as illustrated with reference to FIG. 5), then UE 415-*a* may select a UE 415 for transmitting feedback message 430 or transmit the feedback message 430 based on the number of other UEs generating feedback signaling, a number of sidelink or feedback transmissions during a reporting period, an order of the sidelink or feedback transmissions in the reporting period, or the like. For instance, UE 415-*a* may select UE 415-*b* to transmit the feedback message 430 if UE 415-*a* is the last UE 415 to transmit a feedback message or to receive a sidelink message. In some examples, UE 415-*a* may determine to transmit feedback message 430 on the PUCCH 410 in a number of scheduled sidelink transmissions or feedback messages satisfies a threshold (e.g., if too many transmissions are scheduled, or if a size of an aggregated feedback message would exceed a UE capability, or the like). In some examples, UE 415-*a* may determine which UE 415 (including UE 415-*a*) is to transmit feedback message 430 based on a processing capability of UE 415-*a*, UE 415-*b*, or both. In some examples, UE 415-*a* may determine which UE 415 (including UE 415-*a*) is to transmit feedback message 430 based on a codebook type (e.g., type 1 or type 2) of feedback message 430, a number of HARQ bits for feedback message 430 (e.g., if a number of HARQ bits satisfies a threshold number of HARQ bits), or any combination thereof.

In some examples, UE 415-*a* may transmit feedback message 430 on PUCCH 410 based on a number of dropped transmissions. For example, if UE 415-*a* drops sidelink message 425 (e.g., for higher priority signaling), then UE 415-*a* may transmit feedback message 430 (e.g., instead of assigning UE 415-*b* to transmit the feedback message 430). In some examples, UE 415-*a* may transmit feedback message 430 if a number of dropped or failed transmissions satisfies a threshold number of dropped transmissions. For instance, if UE 415-*a* or other UEs 415 drop all sidelink transmissions within a time period (e.g., a reporting time period), then UE 415-*a* may transmit the feedback message 430 on PUCCH 410.

In some examples, UE 415-*a* may multiplex feedback signaling with data signaling. For example, UE 415-*a* may transmit feedback message 430 (e.g., instead of delegating feedback signaling to UE 415-*b*) if feedback message 430 is to be multiplexed on or with data signaling on a PUSCH. in such cases, UE 415-*a* may multiplex HARQ signaling in a PUSCH.

In some examples, UE 415-a may communicate with multiple additional UEs 415, which may affect feedback signaling, as described in greater detail with reference to FIG. 5.

Figure 5:
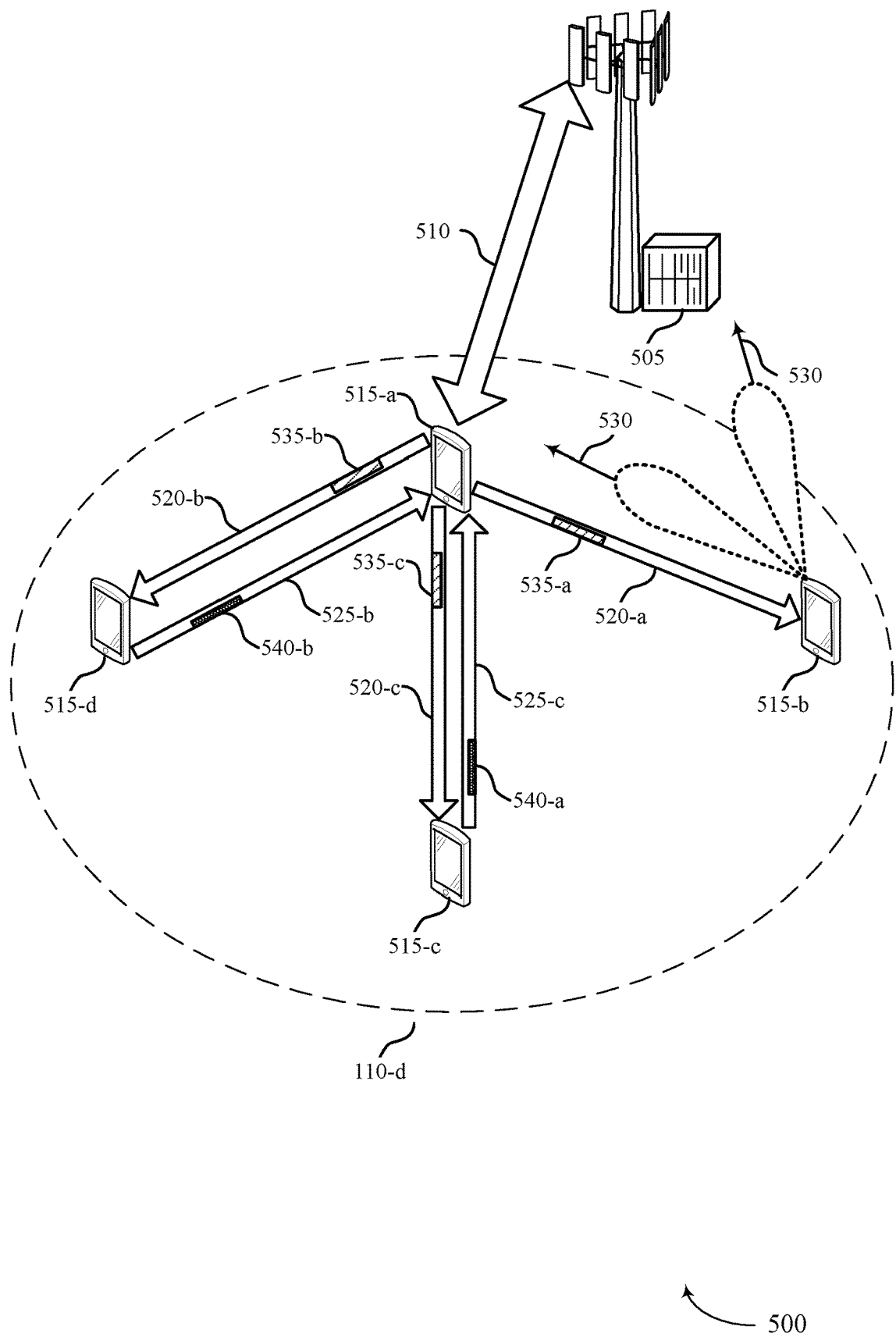
FIG. 5 illustrates an example of a wireless communications system that supports sidelink feedback for multiple transmit receive points in accordance with aspects of the present disclosure.

FIG. 5 illustrates an example of a wireless communications system 500 that supports sidelink feedback for multiple transmit receive points in accordance with aspects of the present disclosure. Wireless communications system 500 may include a base station 505, and one or more UEs 515 (e.g., UE 515-a, UE 515-b, UE 515-c, and UE 515-d), which may be examples of corresponding devices described with reference to FIGS. 1-4. In some examples, UE 515-a may be an example of a PLC, and UE 515-b, UE 515-c, and UE 515-d may be examples of SAs.

In some examples, base station 505 may configure resources for feedback signaling (e.g., PUCCH resources for multicasting a feedback message to UE 515-a and to base station 505). In some examples (e.g., case 2 as described with reference to FIG. 3), base station 505 may transmit an indication of PUCCH resources to each UE 515 that may transmit the feedback signaling (e.g., UE 515-a, UE 515-b, UE 515-c, and UE 515-d). In such examples, base station 505 may transmit PUCCH configuration information (e.g., one or more RRC information elements (IEs)) to each UE 515 in communication with UE 515-a (e.g., all SAs served by UE 515-a, located within coverage area 110-d, or the like). In some examples, UE 515-a (e.g., a PLC) may inform base station 505 (e.g., via Uu link 510) of its association with other UEs 515 (e.g., SAs) to facilitate such RRC signaling. For example, if UE 515-a is in communication with UE 515-b, UE 515-c, and UE 515-d, then UE 515-a may transmit an uplink message to base station 505, the uplink message including an indication of UE 515-b, UE 515-c, and UE 515-d (e.g., the indication may include a UE identifier, location information, or the like, for each of UE 515-b, UE 515-c, and UE 515-d). In such examples, UE 515-a may transmit such an uplink message based on its configuration (e.g., for CG type 2 sidelink configurations where the same PUCCH resource set is configured for all sidelink CGs). Upon receiving the uplink message, base station 505 may transmit the same RRC IEs to each of UE 515-b, UE 515-c, and UE 515-d. In some examples, (e.g., sidelink DG configurations), UE 515-a may refrain from transmitting such an uplink message, and base station 505 may configure different PUCCH resources for each of UE 515-b, UE 515-c, and UE 515-d (e.g., via different RRC IE values). If UE 515-a delegates UE 515-b for transmitting feedback message 530 (e.g., in case 1), then UE 515-a may transmit the feedback message 530 on the PUCCH resources indicated in the RRC IEs.

In some examples, (e.g., case 1, as described with reference to FIG. 3), base station 505 may transmit the RRC signaling to UE 515-a, and UE 515-a may relay the PUCCH configuration information to other UEs 515 via sidelink channels (e.g., PSSCHs 520).

In some examples, a single feedback message 530 may include HARQ bits for different UEs 515 (e.g., different SAs). For example, UE 515-a may transmit a sidelink message 535-b to UE 515-d on a sidelink channel (e.g., PSSCH 520-b). UE 515-d may generate HARQ bits for a feedback message 540-b (e.g., an ACK message or a NACK message). UE 515-d may transmit the feedback message 540-b on a sidelink channel (e.g., PSFCH 525-b). Similarly, UE 515-a may transmit a sidelink message 535-c to UE 515-c on a sidelink channel (e.g., a PSSCH 520-c). UE 515-c may transmit, in response to the sidelink message 535-c, a feedback message 540-a (e.g., including HARQ bits for an ACK message or a NACK message) on a sidelink channel (e.g., PSFCH 525-c). In some cases, UE 515-a may also transmit a sidelink message 535-a to UE 515-b (e.g., on PSSCH 520-a).

In some examples, UE 515-b may transmit a feedback message 530 that may include HARQ bits for UE 515-c, UE 515-d, and UE 515-b. For example (e.g., in case 1), UE 515-a may determine a number of HARQ bits that can be included in feedback message 530 with respect to a grant received from base station 505. In such examples, base station 505 may grant sidelink resources to UE 515-a to communicate with UE 515-d, UE 515-c, and UE 515-b via one or more sidelink channels (e.g., PSSCHs 520), and PUCCH resources for reporting feedback to base station 505. UE 515-a may receive feedback signaling from UEs 515, and the number of HARQ bits received by UE 515-a may be based on a size of the allocated PUCCH resources. In such examples, UE 515-a may transmit, to UE 515-b, an indication of the HARQ bits for feedback message 530, a threshold or total number of available HARQ bits for feedback message 530, or both.

In some examples, UE 515-a may relay HARQ bits from feedback signaling from other UEs 515 directly to UE 515-b. For example, upon receiving feedback message 540-b from UE 515-d and feedback message 540-a from UE 515-c, UE 515-a may relay feedback message 540-b and feedback message 540-a (e.g., or the HARQ bits decoded from feedback message 540-b and feedback message 540-a) to UE 515-b. UE 515-a may forward this information in sidelink message 535-a, or in a different sidelink message (e.g., on PSSCH 520-a, a PSCCH, or the like). UE 515-b may aggregate, multiplex, or otherwise combine the HARQ bits received from UE 515-a with HARQ bits for a feedback message associated with sidelink message 535-a, and generate feedback message 530. In such examples, base station 505 and UE 515-a may successfully determine feedback information associated with sidelink signaling including sidelink message 535-b, sidelink message 535-c, and sidelink message 535-a.

In some examples, UE 515-b may determine feedback information for multiple sidelink messages 535 by monitoring sidelink communications between UE 515-a and other sidelink UEs 515 (e.g., by overhearing HARQ signaling from other UEs 515). For example, UE 515-b may monitor one or more sidelink channels (e.g., PSFCH 525-b, PSFCH 525-c, etc.). UE 515-b may receive and decode feedback message 540-b, and sidelink feedback message 540-a. In such examples, UE 515-b may aggregate, multiplex, or otherwise combine the HARQ bits received from UE 515-a with HARQ bits for a feedback message associated with sidelink message 535-a, and generate feedback message 530 including overheard HARQ bits from other UEs 515.

In some examples (e.g., in case 2 as described with reference to FIG. 3), UE 515-b may transmit a feedback message 530 that may include HARQ bits for UE 515-c, UE 515-d, and UE 515-b. UE 515-b may aggregate HARQ bits for receptions form one or more transmitters (e.g., UE 515-c and UE 515-d). UE 515-b may transmit feedback message 530 including feedback information from other UEs 515 (e.g., feedback message 540-b and feedback message 540-a). For example (e.g., in case 2), UE 515-b may determine a number of HARQ bits that can be included in feedback message 530 with respect to a grant received from base station 505. In such examples, base station 505 may grant, to UE 515-b, PUCCH resources for reporting feedback to base station 505 and UE 515-a. However, in order for UE 515-a to successfully receive feedback message 530, it may be important for UE 515-*a* to also determine a number of HARQ bits, position, etc. for the HARQ signaling (e.g., in case of type-1 codebook signaling). In such examples, UE 515-*b* may transmit feedback information (e.g., a number of HARQ bits, a position, or the like) to UE 515-*a*, or base station 505 may provide such information not UE 515-*a*, or any combination thereof. In some examples, base station 505 may (e.g., semi-statically) configure HARQ codebook size to UE 515-*a*, UE 515-*b*, or both, such that UE 515-*a* can successfully receive and decode the feedback message 530. HARQ bits may be sorted according to the UE identifier of transmitting UEs 515 (e.g., UE 515-*a*).

In some examples, UE 515-*a* may communicate with multiple UEs 515 (e.g., UE 515-*d*, UE 515-*c*, and UE 515-*b*) during a time period (e.g., a reporting period associated with the PUCCH resources allocated by base station 505). In such examples, UE 515-*a* may configure the last UE 515 with which it communicates to transmit feedback message 530. For example, UE 515-*a* may relay any sidelink feedback messages 540 (e.g., feedback message 540-*b* and feedback message 540-*a*) to UE 515-*b*, to be included in feedback message 530. UE 515-*a* may also relay any dropped transmissions to UE 515-*b*. For instance, if UE 515-*a* drops sidelink message 535-*b*, then UE 515-*d* may not receive sidelink message 535-*b*. In some examples, UE 515-*d* may not be aware that sidelink message 535-*b* was dropped. In such examples, UE 515-*a* may transmit an indication of dropped sidelink message 535-*b*, and UE 515-*b* may include feedback information (e.g., a NACK message) associated with dropped sidelink message 535*b* in feedback message 530. UE 515-*a* may also indicate, to UE 515-*b*, any non-DCI-detection. In some examples, UE 515-*b* may monitor PSFCH reported by other UEs 515 (e.g., other SAs), and may include monitored feedback information in a HARQ codebook for feedback message 530.

In some examples, a UE 515-*b* may multicast feedback message 530 to both UE 515-*a* and base station 505 via a sidelink channel (e.g., a PSFCH instead of a PUCCH), as described in greater detail with reference to FIG. 6.

Figure 6:
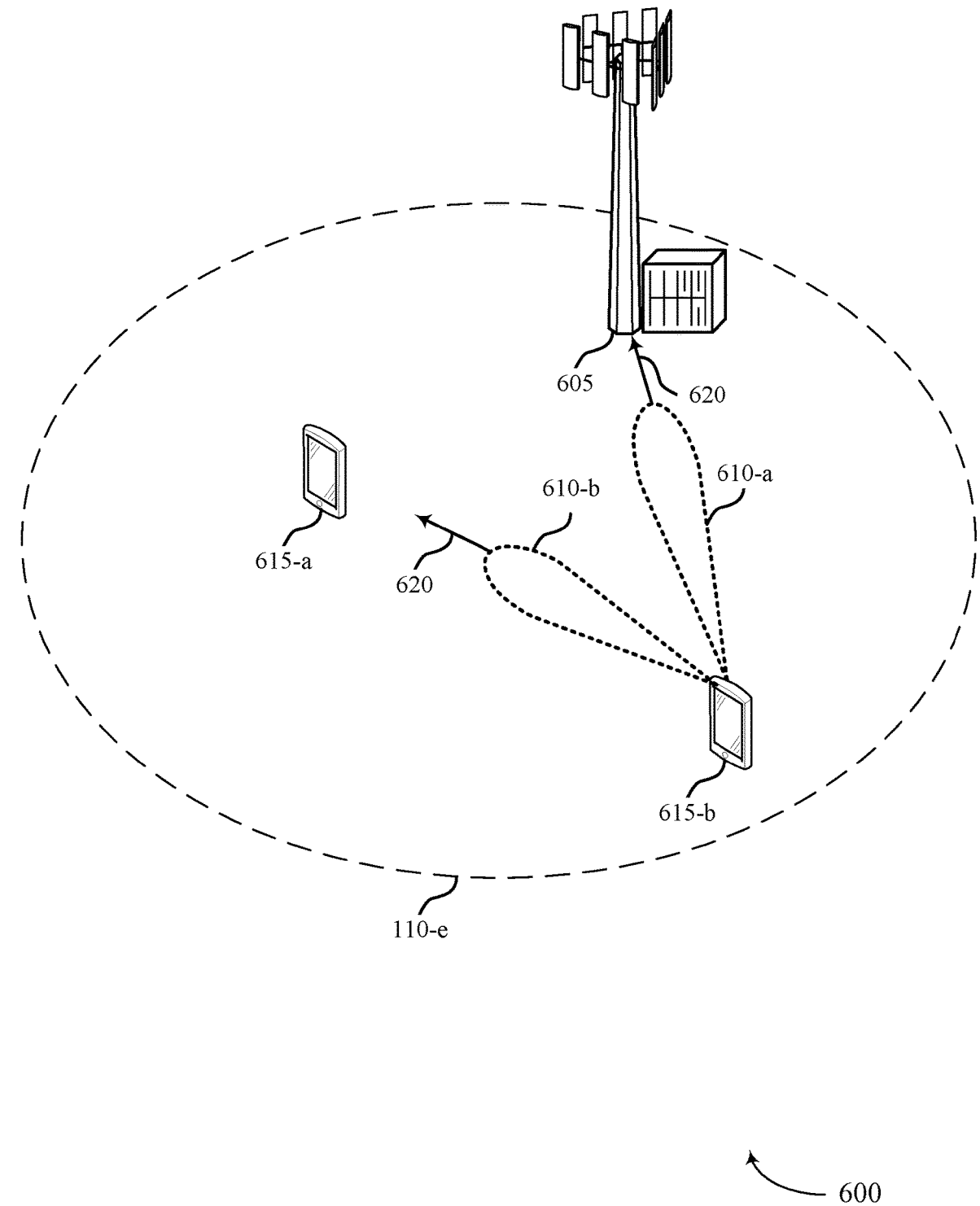
FIG. 6 illustrates an example of a wireless communications system that supports sidelink feedback for multiple transmit receive points in accordance with aspects of the present disclosure.

FIG. 6 illustrates an example of a wireless communications system 600 that supports sidelink feedback for multiple transmit receive points in accordance with aspects of the present disclosure. Wireless communications system 600 may include a base station 605, a UE 615-*a*, and a UE 615-*b*, which may be examples of corresponding devices described with reference to FIGS. 1-5. In some examples, UE 615-*a* may be a PLC, and UE 615-*b* may be an SA.

In some examples, UE 615-*a* may multicast a feedback message 620 to both UE 615-*a* and base station 605. UE 615-*b* may transmit the feedback message 620 on a single beam that is trained toward both UE 615-*a* and base station 605, or on two separate beams (e.g., beam 610-*a* trained toward base station 605 and beam 60-*b* trained toward UE 615-*a*). UE 615-*b* may generate a feedback message for a sidelink message transmitted by UE 615-*a* to UE 615-*b*, as described with reference to FIGS. 3 and 4. UE 615-*b* may generate and transmit a feedback message 620 that includes feedback information from other UEs 615, as described with reference to FIG. 5. However, instead of transmitted feedback message 620 on a PUCCH, as described with reference to FIGS. 2-5, UE 615-*b* may transmit feedback message 620 on a sidelink channel (e.g., a PSFCH). Techniques for UE 615-*a* select UE 615-*b* for transmitting feedback information (e.g., from other UEs 615), techniques for combining, encoding, determining codebook type or size, or the like, as described with reference to FIGS. 2-5, are applicable to techniques described with reference to FIG. 6.

In some examples, base station 605 may manage a PSFCH pool (e.g., a pool of sidelink resources on a PSFCH). Base station 605 may manage PSFCH resource partitioning. In such examples, a single sub-pool (e.g., of the pool of sidelink resources) may be shared by a set of legacy UEs 615 (e.g., all legacy UEs 615). In some examples, a single sub-pool (e.g., of the pool of sidelink resources) may be managed by a base station (e.g., base station 605). In such examples, base station 605 may allocate sidelink resources to UE 615-*b* for transmitting the feedback message 620 on the sidelink. In some examples, pools or sub-pools of resources may at least partially overlap.

In some examples, base station 605 may allocate resources (e.g., HARQ resources on a PSFCH) for transmitting (e.g., multicasting) the feedback message 620. Base station 605 may transmit (e.g., to UE 615-*b*, UE 615-*a*, or both), a DCI message (e.g., a format 3_0 DCI), which may include a field (e.g., a PUCCH resource indicator field) indicating PSFCH or PUCCH resources. In some examples, (e.g., for CG scenarios), base station 605 may transmit (e.g., to UE 615-*b*, UE 615-*a*, or both) an RRC IE, or the like, for a CG.

In some examples, UE 615-*a* (e.g., a PLC) may manage a PSFCH pool (e.g., a pool of sidelink resources). UE 615-*a* may manager PSFCH resource partitioning. One sub-pool of the sidelink resources may be shared by a set (e.g., all) of legacy UEs 615. One sub-pool of resources may be managed by UE 615-*a*. In some examples, base station 605 may assign a sub-pool of resources to UE 615-*a* for resource management. UE 615-*a* may, in such examples, allocate resources from the assigned sub-pool of sidelink resources to UE 615-*b* for transmitting the feedback message 620. For example, UE 615-*a* may transmit, to UE 615-*b*, a sidelink message (e.g., an SCI including a field allocating sidelink resources for the feedback message 620 (e.g., a PSFCH resource indicator field). In some examples, UE 615-*a* may transmit, to UE 615-*b*, a sidelink RRC message including an IE indicating the sidelink resources allocating for feedback message 620. In some examples, UE 615-*a* may indicate a PSFCH-RI to base station 605 (e.g., in a SR, a BSR message, or the like). Base station 605 may monitor the PSFCH (e.g., on a per UE 615 or per SA basis) based on the PSFCH-RI. In some examples, UE 615-*a* may transmit a request to base station 605, requesting that base station 605 monitor the PSFCH based on channel conditions (e.g., channel conditions between UE 615-*a* and UE 615-*b* on the sidelink), traffic priority, or the like.

In some examples, base station 605 may proactively monitor a sidelink (e.g., a PSFCH) to receive feedback message 620 on the sidelink. In some examples, base station 605 may decode a PSFCH proactively based on a grant (e.g., a TDRA grant, an FDRA grant, or the like) provided in a DCI message (e.g., a DCI format 3_0), based on a transmitter identifier (e.g., an UE identifier for UE 615-*a* or UE 615-*b* or both), PSFCH periodicity, PSFCH HARQ resource configuration, or the like. Base station 605 may determine (e.g., autonomously or based on signaling requested from and received from UE 615-*a*) additional PSFCH information to assign in monitoring the PSFCH. Base station 605 may proactively provide retransmission resource grants to UE 615-*a* (e.g., for retransmitting the sidelink message to UE 615-*b*) based on detecting a NACK message (e.g., feedback message 620). In some examples, UE 615-*a* may provide (e.g., to base station 605), a list of SAs (e.g., including UE 615-*b*) that base station 605 is to monitor for on the PSFCH based on channel conditions (e.g., sidelink channel conditions between UE 615-*a* and UE 615-*b*), traffic quality of service (QoS) requirements, or the like.

Figure 7:
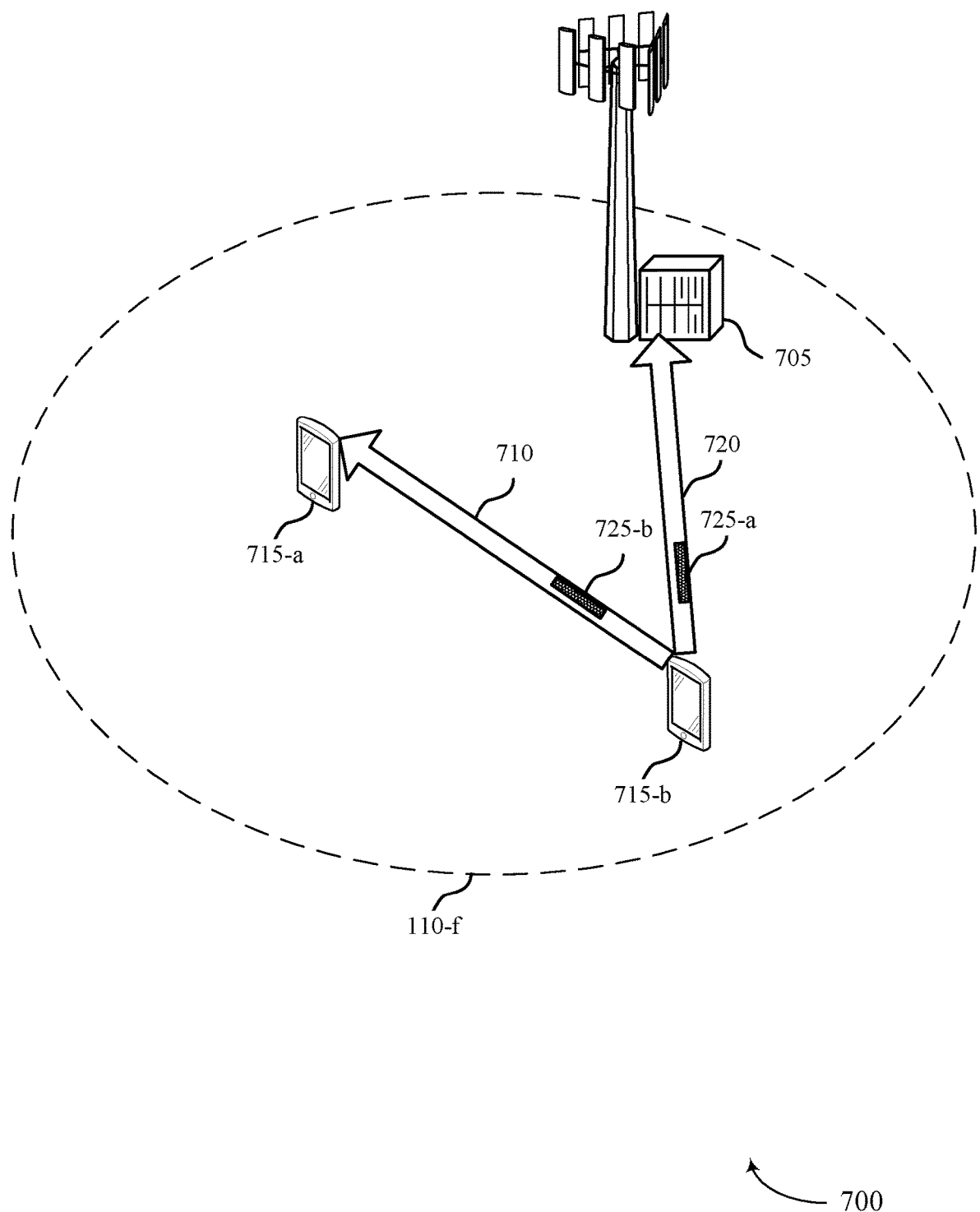
FIG. 7 illustrates an example of a wireless communications system that supports sidelink feedback for multiple transmit receive points in accordance with aspects of the present disclosure.

FIG. 7 illustrates an example of a wireless communications system 700 that supports sidelink feedback for multiple transmit receive points in accordance with aspects of the present disclosure. Wireless communications system 700 may include a base station 705, a UE 715-*a*, and a UE 715-*b*, which may be examples of corresponding devices described with reference to FIGS. 1-6. In some examples, UE 715-*a* may be a PLC, and UE 715-*b* may be an example of an SA.

As described herein, UE 715-*b* may transmit feedback information (e.g., feedback message 725) to both a base station 705 and a UE 715-*a*. In some examples, UE 715-*b* may operate in a dual connectivity mode. For example, UE 715-*b* may maintain (e.g., simultaneously) a Uu link with base station 705 and a sidelink with UE 715-*a*. In such examples, UE 715-*b* may transmit feedback message (e.g., a HARQ ACK or NACK message) on both a PUCCH 720 and a PSFCH 710. UE 715-*b* may transmit feedback message 725-*a* on PUCCH 720 and feedback message 725-*b* on PSFCH 710. UE 715-*b* may transmit feedback message 725-*a* and feedback message 725-*b* simultaneously, or one after the other (e.g., depending on uplink and sidelink processing capability at UE 715-*b*).

UE 715-*b* may transmit feedback message 725-*b* according to a sidelink (PC5) timeline. For example, UE 715-*b* may determine a timing for transmitting feedback message 725 according to a minimum PSFCH time gap, a PSFCH periodicity (e.g., as illustrated with reference to FIG. 8), or both. In some examples, UE 715-*b* may enable or disable HARQ signaling for each PSSCH. UE 715-*b* may transmit feedback message 725-*b* according to a sidelink feedback timing in a SCI message (e.g., according to a K1 sidelink feedback timing). UE 715-*b* may determine or select a codebook type for transmitting feedback message 725-*b*. In some examples, UE 715-*b* may utilize a codebook type associated with PUCCH signaling (e.g., type 1 codebook or type 2 codebook) for feedback message 725-*b* on PSFCH 710. In some examples, UE 715-*b* may apply a codebook type that is specific to sidelink signaling.

UE 715-*b* may transmit feedback message 725-*a* according to a Uu timeline. UE 715-*b* may transmit feedback message 725-*a* according to a codebook type (e.g., type 1 codebook or type 2 codebook), according to a timing (e.g., a K1 slot timing). In some examples, UE 715-*b* may skip HARQ signaling for any or each transport block (TB) (e.g., upon indication from base station 705 via a DCI message, such as a DCI format 3_0).

In some examples, UE 715-*a* and base station 705 may communicate one or more parameters for combining, soft-combining, multiplexing or otherwise compiling HARQ bits for various feedback messages, or other uplink signaling with feedback message 725. For example, as described in greater detail with reference to FIG. 5, UE 715-*b* may overhear (e.g., monitor) feedback signaling between various UEs 715 (e.g., SAs) and UE 715-*a*, or UE 715-*a* may transmit multiplexing information or relay additional feedback signals to UE 715-*b*. In such examples, UE 715-*b* may combine or multiplex received or overheard signaling with feedback message 725. In some examples, feedback message 725 (e.g., as transmitted on both PSFCH 710 and PUCCH 720) may be used for radio link failure (RLF) detection for both the sidelink and the Uu link.

The contents of feedback message 725-*a* and feedback message 725-*b* may be the same (e.g., based on decoding of a PSSCH by UE 715-*b*). A same SA (e.g., UE 715-*b*) may transmit the feedback message 725 to both a PLC (e.g., UE 715-*a*) and a base station (e.g., base station 705). UE 715-*a* and base station 705 may cooperate for retransmission in the event that feedback message 725 includes a NACK message). For example, retransmission may be via the sidelink or the Uu link.

In some examples, the contents of feedback message 725-*a* and feedback message 725-*b* may be different. For example, (e.g., in cases where the sidelink is weaker than the Uu link), UE 715-*b* may transmit an ACK message in feedback message 725-*b* and a NACK message in feedback message 725-*a*. Such signaling may result in retransmission by base station 705 on the Uu link (e.g., instead of triggering retransmission that is likely to fail on a week sidelink). In some examples, some HARQ information corresponding to the PSSCH may be conveyed on just one of the PSFCH 710 or PUCCH 720. For example, base station 705 may transmit a DCI message (e.g., DCI format 3_0) granting PSSCH resources (e.g., 3 PSSCH resources). A number (e.g., two) of HARQ messages associated with the same number (e.g., two) of the PSSCH resources may be conveyed on PSFCH 710, and a second number (e.g., one) of HARQ message associated with the same number (e.g., one) of the PSSCH resources may be conveyed on PUCCH 720.

Feedback message 725-*a* on PUCCH 720 and feedback message 725-*b* on PSFCH 710 may be multiplexed via one or more transmission configurations (e.g., TDM, FDM, SDM, or any combination thereof. In some examples, UE 715-*b* may monitor CSI, spatial information (e.g., TCI states, QCL configurations, or the like) for the sidelink, the Uu link, or both. UE 715-*b* may apply different precoding, different beamforming, or the like, for PUCCH 720 and PSFCH 710 (e.g., based on the spatial information, channel conditions, etc.).

Figure 8:
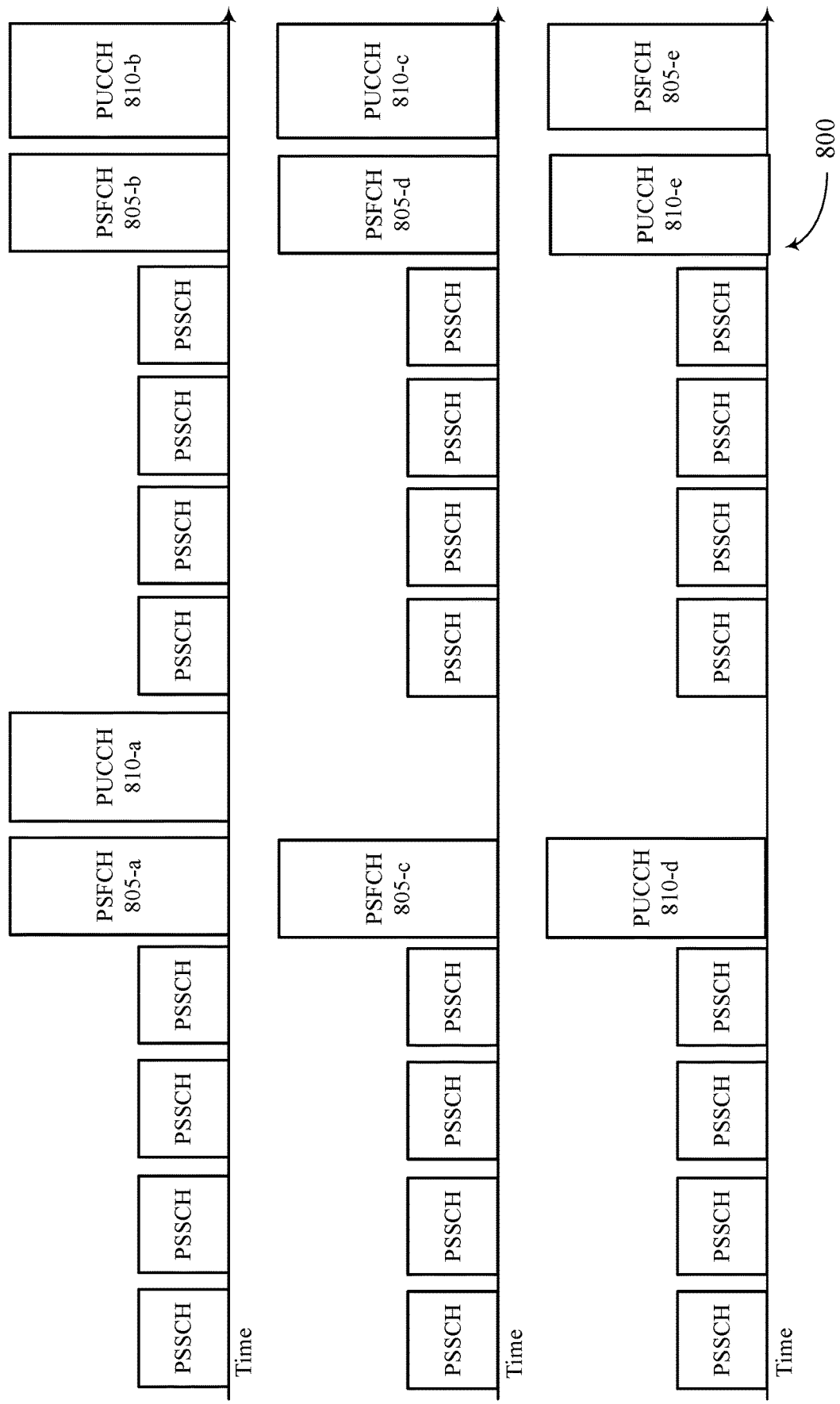
FIG. 8 illustrates an example of a timeline that supports sidelink feedback for multiple transmit receive points in accordance with aspects of the present disclosure.

FIG. 8 illustrates an example of a timeline 800 that supports sidelink feedback for multiple transmit receive points in accordance with aspects of the present disclosure. Timeline 800 may implement or be implemented by one or more wireless devices, such as a UE or a base station, which may be examples of corresponding devices described with reference to FIGS. 1-7.

In some examples, as described with reference to FIG. 7, a UE (e.g., UE 715-*b*) operating in a dual connectivity mode may transmit a feedback message (e.g. feedback message 725) on both a PSFCH 805 and a PUCCH 810. In such examples, UE 715-*b* may transmit the feedback message on a PSFCH 805 and a PUCCH 810 simultaneously, or one after the other. A PLC (e.g., UE 715-*a*) and a base station (e.g., base station 705) may negotiate sidelink and Uu link HARQ delivering timelines depending on one or more conditions or parameters (e.g., based on channel conditions of a sidelink between UE 715-*a* and UE 715-*b*, based on processing capability for UE 715-*b*, based on traffic requirements, or any combination thereof).

In some examples, UE 715-*b* may transmit feedback messages on a PSFCH 805 and a PUCCH 810 at the same periodicity (e.g., at a same frequency). For example, UE 715-*b* may receive one or more sidelink messages on various PSSCHs. UE 715-*b* may generate a feedback message and may transmit the feedback message on PSFCH 805-*a*, PUCCH 810-*a*, or both. After a time period (e.g., according to a first periodicity), UE 715-*b* may transmit another feedback message on PSFCH 805-*b*. After a time period subsequent to PUCCH 810-*a* (e.g., according to the same first periodicity), UE 715-*b* may transmit a feedback message on PUCCH 810-*b*.

In some examples, PUCCH transmissions may be less frequent (or may be skipped) than PSCH transmissions. For example, sidelink channel conditions may be very good (e.g., resulting in a decreased reliance on regular feedback signaling due to a high percentage of successfully received sidelink transmissions and decreased retransmissions). In such examples, UE 715-*b* may transmit feedback messages on PSFCH 805-*c* and on PSFCH 805-*d* according to a first periodicity, and may transmit feedback messages on PUCCH 810-*c* according to a second periodicity that is greater than (e.g., double) the first periodicity. For instance, UE 715-*b* may transmit one PSFCH transmission for each TB, and one PUCCH transmission for multiple TBs (e.g., by specifying a K1 slot timing). In some examples, UE 715-*b* may be configured with PSFCHs 805 and PUCCHs 810 according to a same periodicity, but UE 715-*b* may skip some scheduled PUCCHs 810 (e.g., based on channel conditions for the sidelink satisfying a threshold quality level).

In some examples, PSFCH transmission may be less frequent than PUCCH transmissions. For example, channel conditions for PSFCHs 805 may be weak, or may experience increased congestion, collisions, interference, or the like. In such examples, UE 715-*b* may transmit the feedback signaling on PUCCHs 810 more often than on the PSFCHs 805 (e.g., instead of relying on a low quality PSFCHs 805, where feedback signaling is less likely to be successfully received by UE 715-*a*). In such examples, UE 715-*b* may transmit feedback signaling on PUCCH 810-*d* and on PUCCH 810-*e* according to a first periodicity, and may transmit feedback signaling on PSFCH 805-*e* according to a second periodicity that is larger than the first periodicity (e.g., double the first periodicity). In some examples, UE 715-*b* may be configured with PSFCHs 805 and PUCCHs 810 according to a same periodicity, but UE 715-*b* may skip some scheduled PSFCHs 805 (e.g., based on channel conditions for the sidelink or PSFCHs 805 satisfying or failing to satisfy a threshold quality level).

Figure 9:
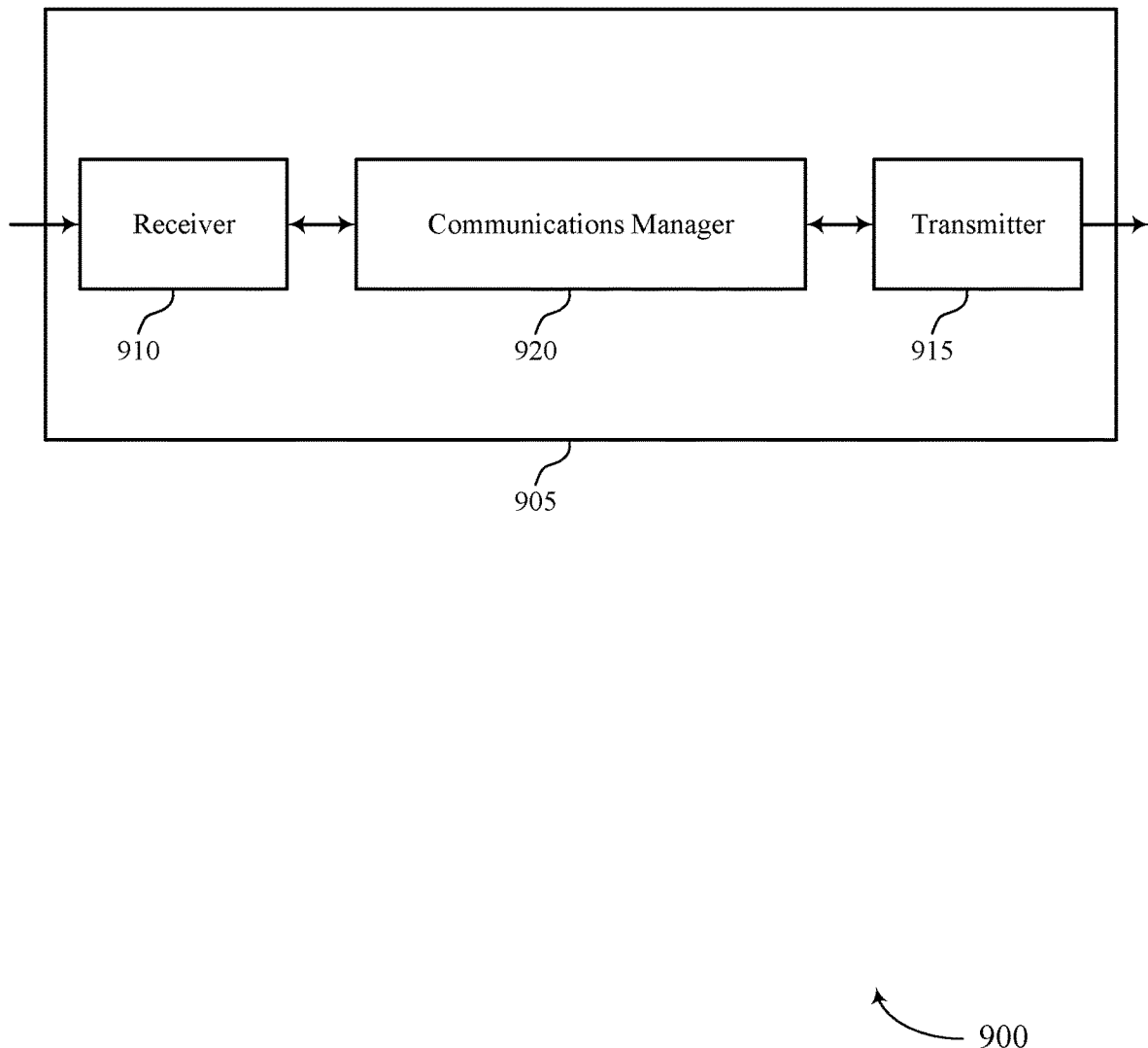
FIGS. 9 and 10 show block diagrams of devices that support sidelink feedback for multiple transmit receive points in accordance with aspects of the present disclosure.

FIG. 9 shows a block diagram 900 of a device 905 that supports sidelink feedback for multiple transmit receive points in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to sidelink feedback for multiple transmit receive points). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to sidelink feedback for multiple transmit receive points). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of sidelink feedback for multiple transmit receive points as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving, from a base station via a first communication link, an allocation of resources for communicating with a second UE via a second communications link. The communications manager 920 may be configured as or otherwise support a means for receiving, from the second UE via the second communications link, a sidelink message in accordance with the allocation of resources. The communications manager 920 may be configured as or otherwise support a means for transmitting a feedback message associated with the sidelink message to the base station and the second UE via one or more of the first communication link, or the second communication link.

Additionally, or alternatively, the communications manager 920 may support wireless communications at a UE in accordance with examples as disclosed herein. For example, the communications manager 920 may be configured as or otherwise support a means for receiving, from a base station via a first communication link, an allocation of resources for communicating with a second UE via a second communications link. The communications manager 920 may be configured as or otherwise support a means for transmitting, to the second UE via the second communications link, a sidelink message in accordance with the allocation of resources. The communications manager 920 may be configured as or otherwise support a means for receiving, from the second UE, a feedback message associated with the sidelink message, where the feedback message is multicast to the UE and the base station via one or more of the first communication link, or the second communication link.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for feedback signaling to a base station and a transmitting UE, which may result in decreased system latency, improved system efficiency, more efficient utilization of available resources, and improved user experience.

Figure 10:
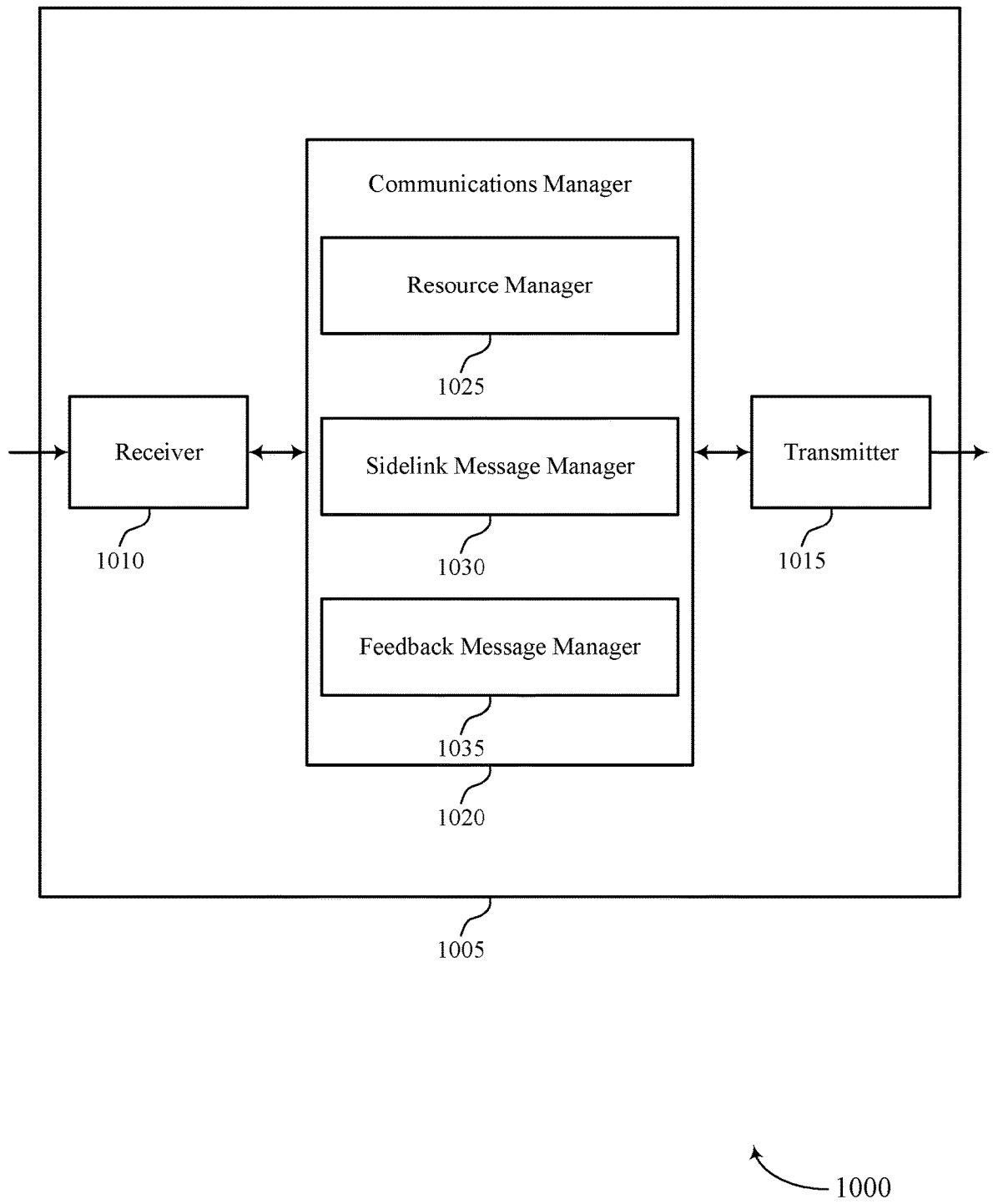

FIG. 10 shows a block diagram 1000 of a device 1005 that supports sidelink feedback for multiple transmit receive points in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to sidelink feedback for multiple transmit receive points). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to sidelink feedback for multiple transmit receive points). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of sidelink feedback for multiple transmit receive points as described herein. For example, the communications manager 1020 may include a resource manager 1025, a sidelink message manager 1030, a feedback message manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The resource manager 1025 may be configured as or otherwise support a means for receiving, from a base station via a first communication link, an allocation of resources for communicating with a second UE via a second communications link. The sidelink message manager 1030 may be configured as or otherwise support a means for receiving, from the second UE via the second communications link, a sidelink message in accordance with the allocation of resources. The feedback message manager 1035 may be configured as or otherwise support a means for transmitting a feedback message associated with the sidelink message to the base station and the second UE via one or more of the first communication link, or the second communication link.

Additionally, or alternatively, the communications manager 1020 may support wireless communications at a UE in accordance with examples as disclosed herein. The resource manager 1025 may be configured as or otherwise support a means for receiving, from a base station via a first communication link, an allocation of resources for communicating with a second UE via a second communications link. The sidelink message manager 1030 may be configured as or otherwise support a means for transmitting, to the second UE via the second communications link, a sidelink message in accordance with the allocation of resources. The feedback message manager 1035 may be configured as or otherwise support a means for receiving, from the second UE, a feedback message associated with the sidelink message, where the feedback message is multicast to the UE and the base station via one or more of the first communication link, or the second communication link.

Figure 11:
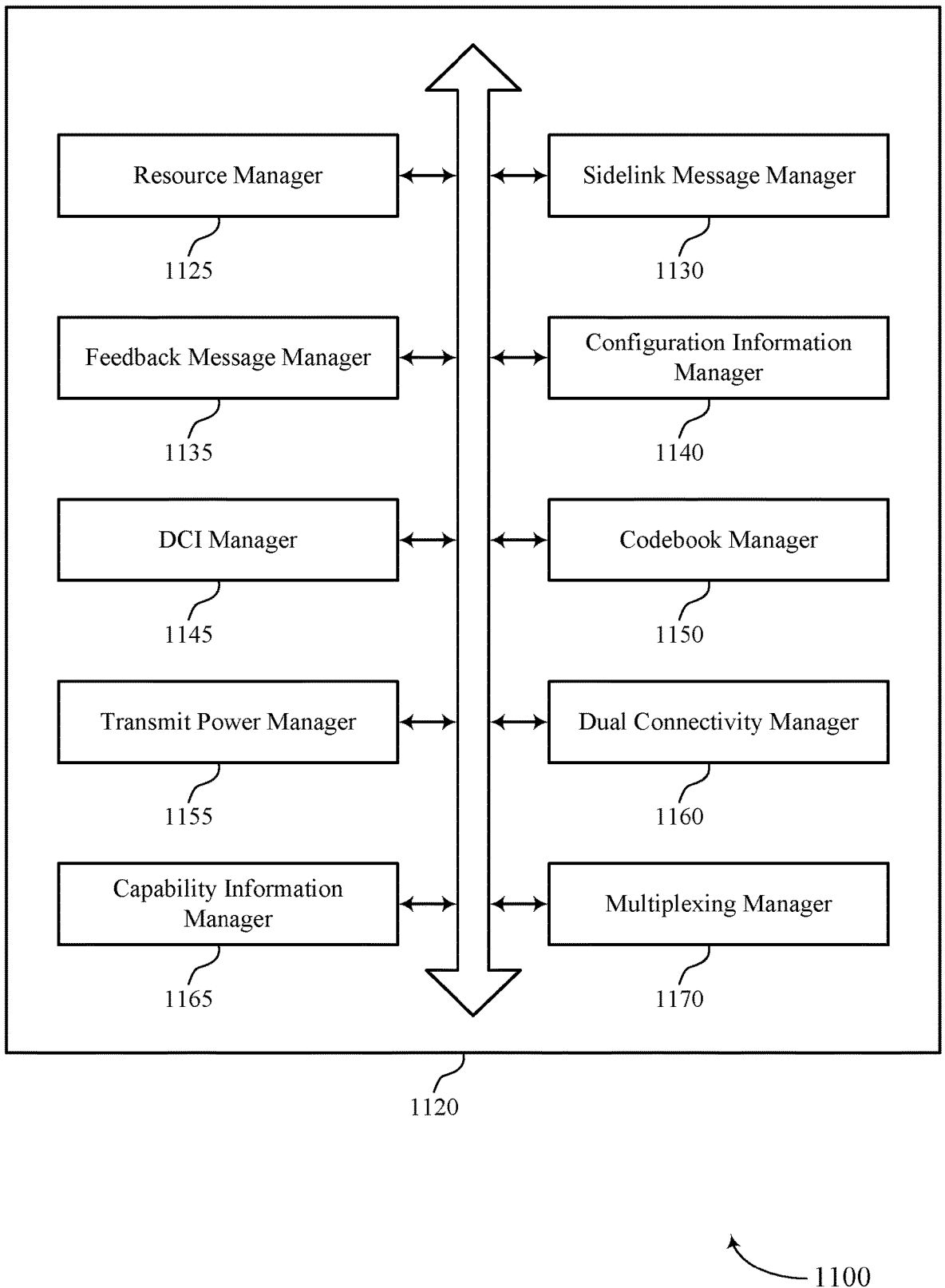
FIG. 11 shows a block diagram of a communications manager that supports sidelink feedback for multiple transmit receive points in accordance with aspects of the present disclosure.

FIG. 11 shows a block diagram 1100 of a communications manager 1120 that supports sidelink feedback for multiple transmit receive points in accordance with aspects of the present disclosure. The communications manager 1120 may be an example of aspects of a communications manager 920, a communications manager 1020, or both, as described herein. The communications manager 1120, or various components thereof, may be an example of means for performing various aspects of sidelink feedback for multiple transmit receive points as described herein. For example, the communications manager 1120 may include a resource manager 1125, a sidelink message manager 1130, a feedback message manager 1135, a configuration information manager 1140, a DCI manager 1145, a codebook manager 1150, a transmit power manager 1155, a dual connectivity manager 1160, a capability information manager 1165, a multiplexing manager 1170, or any combination thereof. Each of these components may communicate, directly or indirectly, with one another (e.g., via one or more buses).

The communications manager 1120 may support wireless communications at a UE in accordance with examples as disclosed herein. The resource manager 1125 may be configured as or otherwise support a means for receiving, from a base station via a first communication link, an allocation of resources for communicating with a second UE via a second communications link. The sidelink message manager 1130 may be configured as or otherwise support a means for receiving, from the second UE via the second communications link, a sidelink message in accordance with the allocation of resources. The feedback message manager 1135 may be configured as or otherwise support a means for transmitting a feedback message associated with the sidelink message to the base station and the second UE via one or more of the first communication link, or the second communication link.

In some examples, the configuration information manager 1140 may be configured as or otherwise support a means for receiving, from the second UE, configuration information for the feedback message, the configuration information including an instruction to utilize resources allocated to the second UE by the base station for transmitting the feedback message on the first communication link on a physical uplink channel.

In some examples, to support configuration information, the configuration information manager 1140 may be configured as or otherwise support a means for one or more additional feedback bits for multiplexing with the feedback message, time division multiplexing information, frequency division multiplexing information, space division multiplexing information, or any combination thereof.

In some examples, to support configuration information, the configuration information manager 1140 may be configured as or otherwise support a means for an indication of a first type of codebook, codebook size information, a reporting time period, one or more bits for multiplexing with the feedback message, an indication of a size of the feedback message, a subcarrier spacing for a communication link between the second UE and the base station, a bandwidth part associated with the first communication link, a sidelink resource pool bitmap, an indication of a feedback channel periodicity, or any combination thereof.

In some examples, to support configuration information, the configuration information manager 1140 may be configured as or otherwise support a means for an indication of a second type of codebook, codebook size information, an indication of a size of the feedback message, an indication of feedback signaling timing for both the first communication link and the second communication link, an indication of a time gap, time domain resource allocation, a sidelink resource pool bitmap, a periodicity for the second communication link, a minimum time gap for the second communication link, a service area identifier, or any combination thereof.

In some examples, the capability information manager 1165 may be configured as or otherwise support a means for transmitting, to the second UE, the base station, or both, capability information indicating a capability to multicast the feedback message to both the base station and the UE, where transmitting the feedback message is based on transmitting the capability information.

In some examples, the resource manager 1125 may be configured as or otherwise support a means for receiving, from the second UE, an indication of one or more uplink resources of a set of one or more uplink resources on the physical uplink channel. In some examples, the feedback message manager 1135 may be configured as or otherwise support a means for determining, based on the indication of the one or more uplink resources, at least one of the one or more resources for transmitting the feedback message. In some examples, the feedback message manager 1135 may be configured as or otherwise support a means for transmitting the feedback message on the determined at least one of the one or more resources.

In some examples, the feedback message manager 1135 may be configured as or otherwise support a means for receiving, from the second UE, uplink signaling information including feedback information associated with a third communications link between the second UE and the base station, channel state information, one or more scheduling requests, or any combination thereof, where the configuration information includes one or more rules for multiplexing the signaling information with the feedback message. In some examples, the multiplexing manager 1170 may be configured as or otherwise support a means for multiplexing the signaling information with the feedback message in accordance with the one or more rules and based at least in a part on a codebook type for the feedback message, where transmitting the feedback message is based on the multiplexing.

In some examples, the feedback message manager 1135 may be configured as or otherwise support a means for receiving, from the second UE, a second feedback message associated with a second sidelink message transmitted by the second UE to a third UE. In some examples, the multiplexing manager 1170 may be configured as or otherwise support a means for multiplexing the second feedback message with the feedback message, where transmitting the feedback message is based on the multiplexing.

In some examples, the feedback message manager 1135 may be configured as or otherwise support a means for monitoring a third communication link between the second UE and a third UE. In some examples, the feedback message manager 1135 may be configured as or otherwise support a means for receiving a second feedback message transmitted by the third UE to the second UE. In some examples, the feedback message manager 1135 may be configured as or otherwise support a means for including the second feedback message in the feedback message.

In some examples, the feedback message manager 1135 may be configured as or otherwise support a means for receiving, from at least one of the base station or the second UE, an instruction to monitor the third communication link for the second feedback message, an instruction to include the second feedback message in the feedback message, or both.

In some examples, the DCI manager 1145 may be configured as or otherwise support a means for receiving, from the base station, a downlink control information message indicating configuration information for transmitting the feedback message on the first communication link on a physical uplink channel, the feedback information including an instruction to transmit the feedback message, one or more bits for multiplexing with the feedback message, UE identifiers for one or more additional UEs, codebook size information, codebook type information, or any combination thereof.

In some examples, the feedback message manager 1135 may be configured as or otherwise support a means for aggregating feedback information associated with a set of one or more transmissions from the second UE, the set of one or more transmissions including the sidelink message. In some examples, the feedback message manager 1135 may be configured as or otherwise support a means for generating the feedback message based on the aggregated feedback information.

In some examples, the codebook manager 1150 may be configured as or otherwise support a means for receiving, from the base station, an indication of a codebook size. In some examples, the codebook manager 1150 may be configured as or otherwise support a means for determining a size of the feedback message based on the indication of the codebook size and an identifier for the UE. In some examples, the codebook manager 1150 may be configured as or otherwise support a means for generating the feedback message according to the determined size.

In some examples, the codebook manager 1150 may be configured as or otherwise support a means for determining a first type of codebook for the feedback message based on a slot timing indicated via higher layer signaling, a subcarrier spacing associated with the first communication link, a bandwidth part associated with the second communication link, a resource pool bitmap associated with the second communication link, a periodicity of feedback signaling associated with the second communication link, or any combination thereof, where transmitting the feedback message is based on determining the first type of codebook.

In some examples, the codebook manager 1150 may be configured as or otherwise support a means for determining a second type of codebook for the feedback message based on a feedback signaling timing for both the first communication link and the second communication link, a time gap indicated in the configuration information, a time domain resource allocation indicated in the configuration information, a sidelink resource pool bitmap, a feedback signaling periodicity on the second communication link, a minimum time gap associated with the second communication link, a service area identifier indicated in the configuration information, or any combination thereof, where transmitting the feedback message is based on determining the second type of codebook.

In some examples, the codebook manager 1150 may be configured as or otherwise support a means for receiving, from the second UE, an indication of a codebook for the feedback message, where transmitting the feedback message is based on receiving the indication of the codebook size.

In some examples, the transmit power manager 1155 may be configured as or otherwise support a means for determining a transmit power associated with the first communication link and a second transmit power associated with the second communication link. In some examples, the transmit power manager 1155 may be configured as or otherwise support a means for comparing the first transmit power and the second transmit power to determine which is larger. In some examples, the transmit power manager 1155 may be configured as or otherwise support a means for selecting, for transmitting the feedback message, one of the first transmit power or the second transmit power based on the comparing.

In some examples, the resource manager 1125 may be configured as or otherwise support a means for determining one or more sidelink resources from a pool of one or more sidelink resources associated with the second communications link, the second communications link including a sidelink, where the feedback message is transmitted via the determined one or more sidelink resources.

In some examples, the resource manager 1125 may be configured as or otherwise support a means for receiving, from the base station, an indication of the one or more sidelink resources, where determining the one or more sidelink resources is based on the indication of the one or more sidelink resources.

In some examples, the resource manager 1125 may be configured as or otherwise support a means for receiving, from the second UE, an indication of the one or more sidelink resources, where determining the one or more sidelink resources is based on the indication of the one or more sidelink resources.

In some examples, the dual connectivity manager 1160 may be configured as or otherwise support a means for identifying a first timing for feedback signaling on the first communication link and a second timing for feedback signaling on the second communication link. In some examples, the dual connectivity manager 1160 may be configured as or otherwise support a means for identifying a codebook type for the feedback message. In some examples, the dual connectivity manager 1160 may be configured as or otherwise support a means for operating in a dual connectivity mode, where the feedback message is transmitted via both the first communication link according to the first timing and the second communication link according to the second timing and the codebook type.

In some examples, the feedback message is transmitted consecutively on the first communication link and the second communication link, based on the processing capability of the UE.

In some examples, the feedback message is transmitted simultaneously on the first communication link and the second communication link, based on the processing capability of the UE.

Additionally, or alternatively, the communications manager 1120 may support wireless communications at a UE in accordance with examples as disclosed herein. In some examples, the resource manager 1125 may be configured as or otherwise support a means for receiving, from a base station via a first communication link, an allocation of resources for communicating with a second UE via a second communications link. In some examples, the sidelink message manager 1130 may be configured as or otherwise support a means for transmitting, to the second UE via the second communications link, a sidelink message in accordance with the allocation of resources. In some examples, the feedback message manager 1135 may be configured as or otherwise support a means for receiving, from the second UE, a feedback message associated with the sidelink message, where the feedback message is multicast to the UE and the base station via one or more of the first communication link, or the second communication link.

In some examples, the configuration information manager 1140 may be configured as or otherwise support a means for transmitting, to the second UE, configuration information for the feedback message, the configuration information including an instruction to utilize resource allocated to the UE by the base station for transmitting the feedback message on the first communication link on a physical uplink channel.

In some examples, the configuration information manager 1140 may be configured as or otherwise support a means for receiving, from the base station, transmission configuration information for the feedback message, the transmission configuration information including a time-division multiplexing configuration, a frequency division multiplexing configuration, a single-frequency network configuration, or any combination thereof. In some examples, the configuration information manager 1140 may be configured as or otherwise support a means for transmitting the transmission configuration information not the second UE, where receiving the feedback message is based on transmitting the configuration information.

In some examples, the configuration information manager 1140 may be configured as or otherwise support a means for selecting the second UE from a set of UEs based on a transmission configuration associated with each UE of the set of UEs, or based on a timing of the feedback message associated with the sidelink message for the second UE, or any combination thereof. In some examples, the feedback message manager 1135 may be configured as or otherwise support a means for transmitting, to the second UE, an instruction to transmit the feedback message to the UE and the base station based on the selecting.

Figure 12:
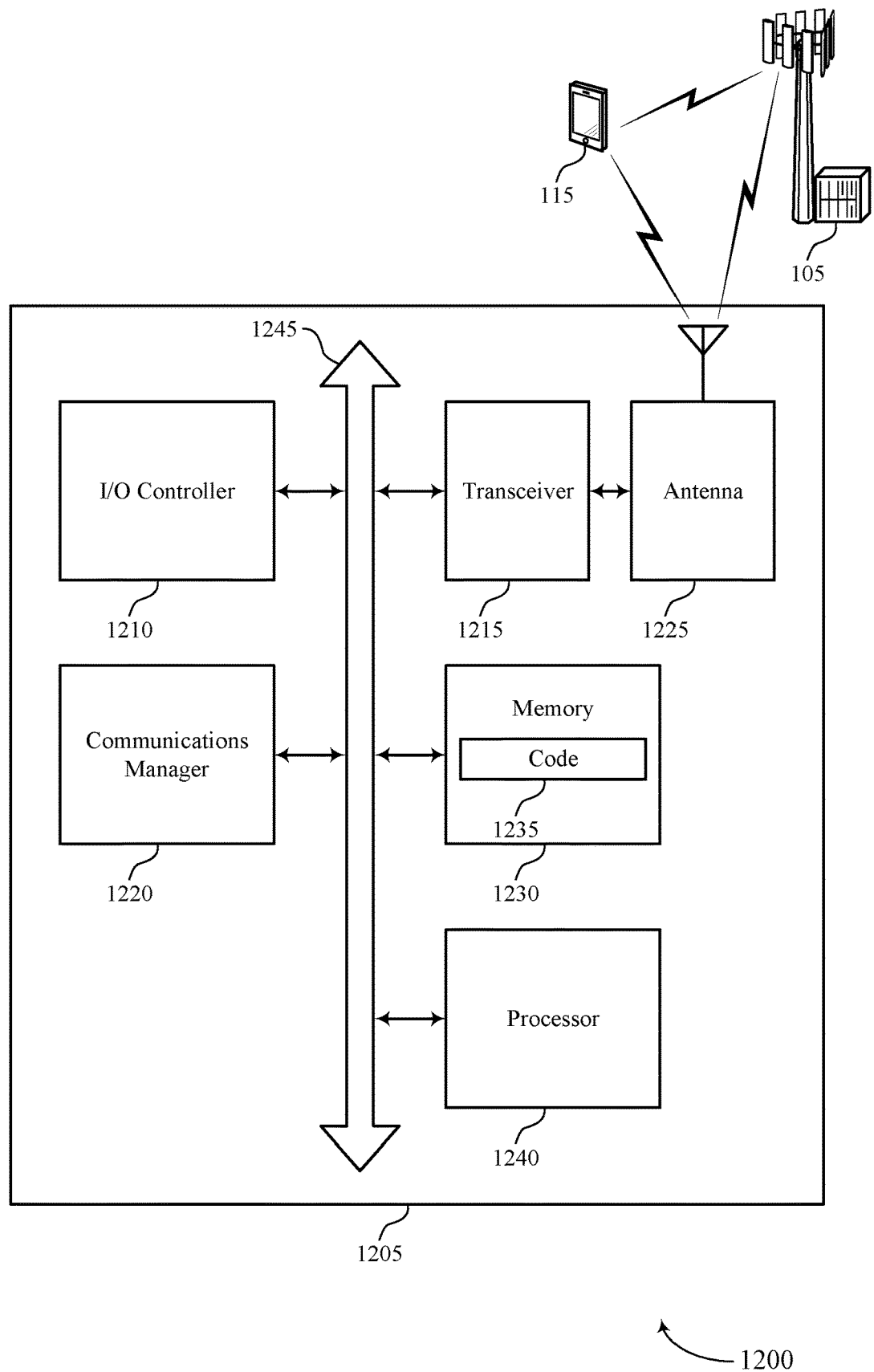
FIG. 12 shows a diagram of a system including a device that supports sidelink feedback for multiple transmit receive points in accordance with aspects of the present disclosure.

FIG. 12 shows a diagram of a system 1200 including a device 1205 that supports sidelink feedback for multiple transmit receive points in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting sidelink feedback for multiple transmit receive points). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving, from a base station via a first communication link, an allocation of resources for communicating with a second UE via a second communications link. The communications manager 1220 may be configured as or otherwise support a means for receiving, from the second UE via the second communications link, a sidelink message in accordance with the allocation of resources. The communications manager 1220 may be configured as or otherwise support a means for transmitting a feedback message associated with the sidelink message to the base station and the second UE via one or more of the first communication link, or the second communication link.

Additionally, or alternatively, the communications manager 1220 may support wireless communications at a UE in accordance with examples as disclosed herein. For example, the communications manager 1220 may be configured as or otherwise support a means for receiving, from a base station via a first communication link, an allocation of resources for communicating with a second UE via a second communications link. The communications manager 1220 may be configured as or otherwise support a means for transmitting, to the second UE via the second communications link, a sidelink message in accordance with the allocation of resources. The communications manager 1220 may be configured as or otherwise support a means for receiving, from the second UE, a feedback message associated with the sidelink message, where the feedback message is multicast to the UE and the base station via one or more of the first communication link, or the second communication link.

By including or configuring the communications manager 1220 in accordance with examples as described herein, the device 1205 may support techniques for feedback signaling to a base station and a transmitting UE, which may result in decreased system latency, improved system efficiency, more efficient utilization of available resources, and improved user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of sidelink feedback for multiple transmit receive points as described herein, or the processor 1240 and the memory 1230 may be otherwise configured to perform or support such operations.

Figure 13:
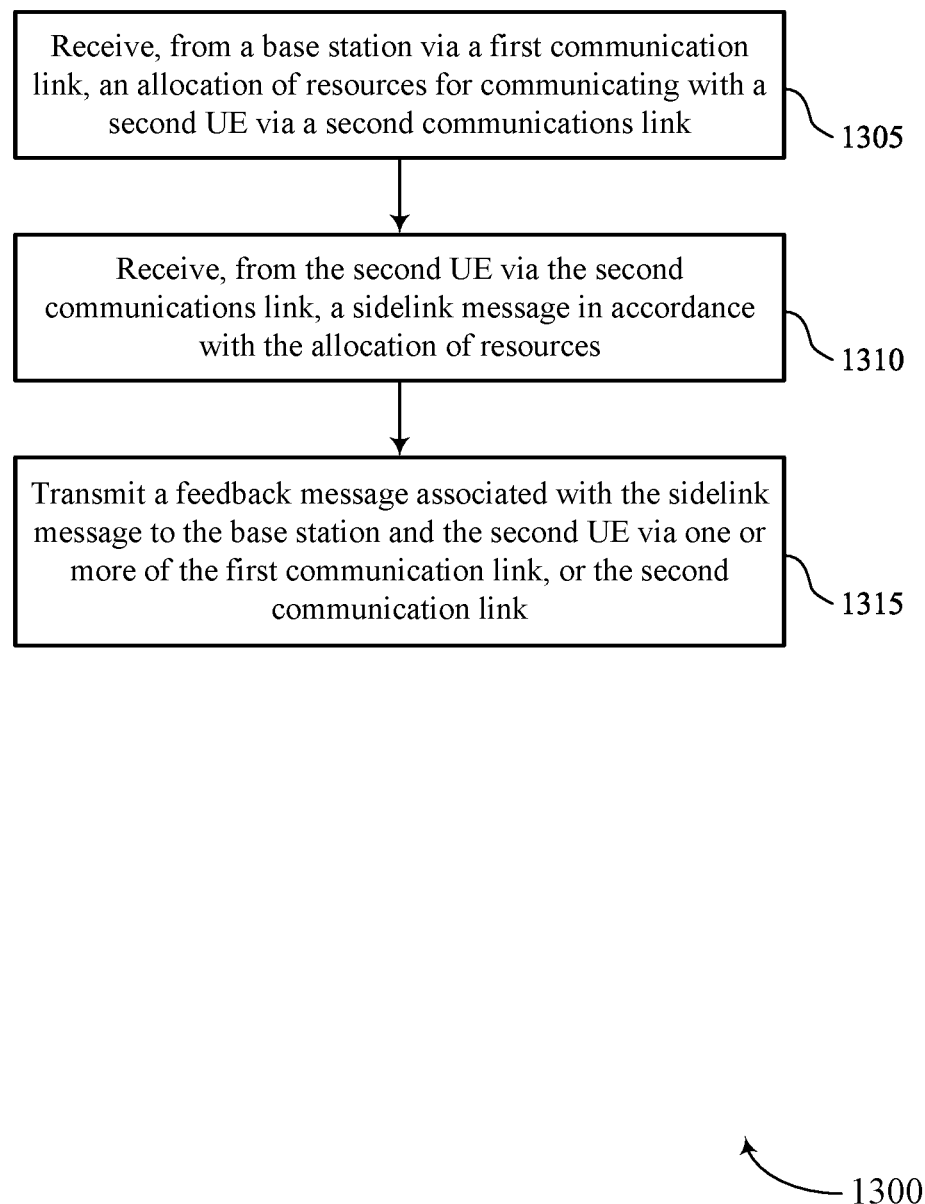
FIGS. 13 through 17 show flowcharts illustrating methods that support sidelink feedback for multiple transmit receive points in accordance with aspects of the present disclosure.

FIG. 13 shows a flowchart illustrating a method 1300 that supports sidelink feedback for multiple transmit receive points in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include receiving, from a base station via a first communication link, an allocation of resources for communicating with a second UE via a second communications link. The operations of 1305 may be performed in accordance with examples as disclosed herein. In some examples, aspects of the operations of 1305 may be performed by a resource manager 1125 as described with reference to FIG. 11.

At 1310, the method may include receiving, from the second UE via the second communications link, a sidelink message in accordance with the allocation of resources. The operations of 1310 may be performed in accordance with examples as disclosed herein. In some examples, aspects of the operations of 1310 may be performed by a sidelink message manager 1130 as described with reference to FIG. 11.

At 1315, the method may include transmitting a feedback message associated with the sidelink message to the base station and the second UE via one or more of the first communication link, or the second communication link. The operations of 1315 may be performed in accordance with examples as disclosed herein. In some examples, aspects of the operations of 1315 may be performed by a feedback message manager 1135 as described with reference to FIG. 11.

Figure 14:
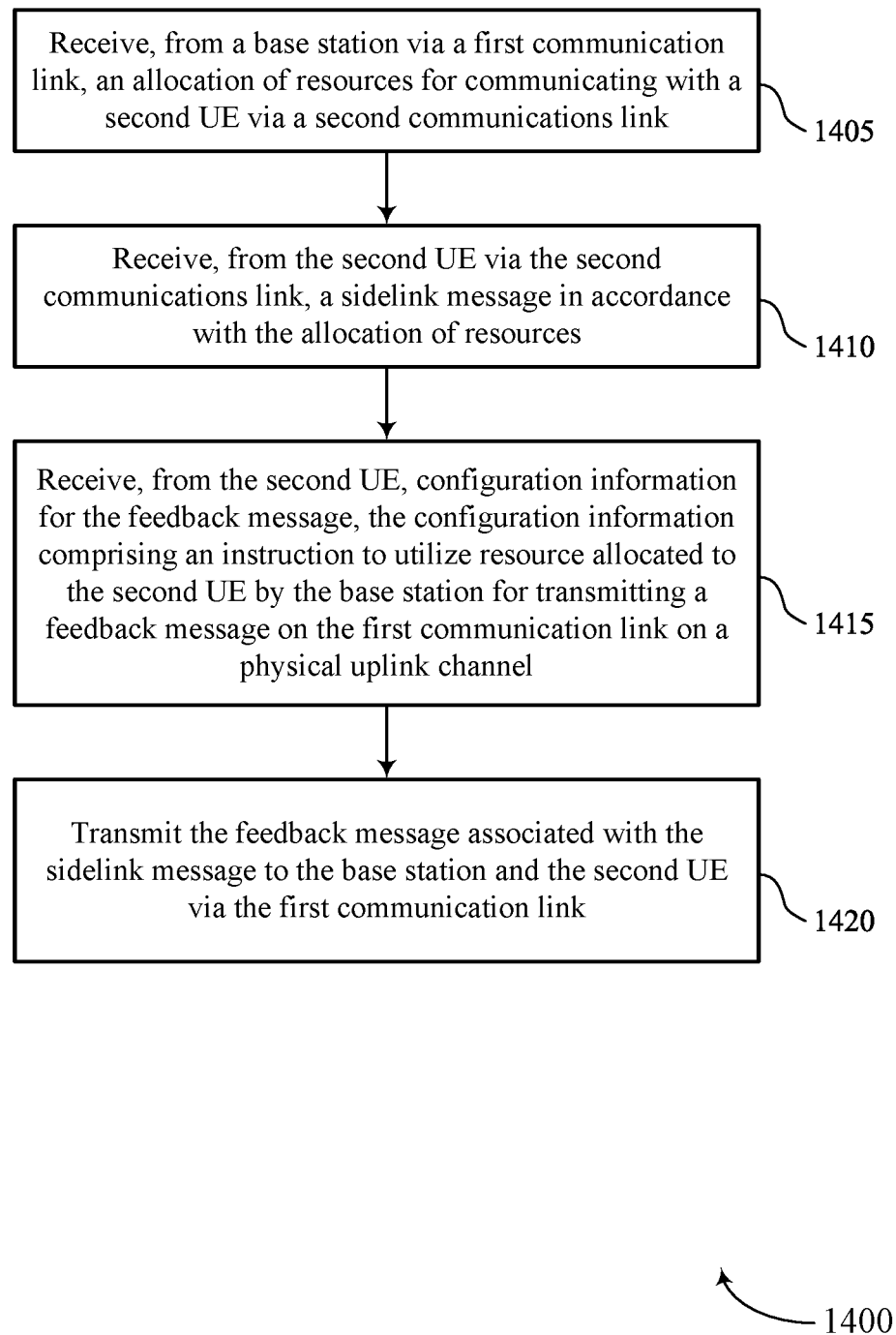

FIG. 14 shows a flowchart illustrating a method 1400 that supports sidelink feedback for multiple transmit receive points in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include receiving, from a base station via a first communication link, an allocation of resources for communicating with a second UE via a second communications link. The operations of 1405 may be performed in accordance with examples as disclosed herein. In some examples, aspects of the operations of 1405 may be performed by a resource manager 1125 as described with reference to FIG. 11.

At 1410, the method may include receiving, from the second UE via the second communications link, a sidelink message in accordance with the allocation of resources. The operations of 1410 may be performed in accordance with examples as disclosed herein. In some examples, aspects of the operations of 1410 may be performed by a sidelink message manager 1130 as described with reference to FIG. 11.

At 1415, the method may include receiving, from the second UE, configuration information for the feedback message, the configuration information including an instruction to utilize resources allocated to the second UE by the base station for transmitting a feedback message on the first communication link on a physical uplink channel. The operations of 1415 may be performed in accordance with examples as disclosed herein. In some examples, aspects of the operations of 1415 may be performed by a configuration information manager 1140 as described with reference to FIG. 11.

At 1420, the method may include transmitting the feedback message associated with the sidelink message to the base station and the second UE via the first communication link. The operations of 1420 may be performed in accordance with examples as disclosed herein. In some examples, aspects of the operations of 1420 may be performed by a feedback message manager 1135 as described with reference to FIG. 11.

Figure 15:
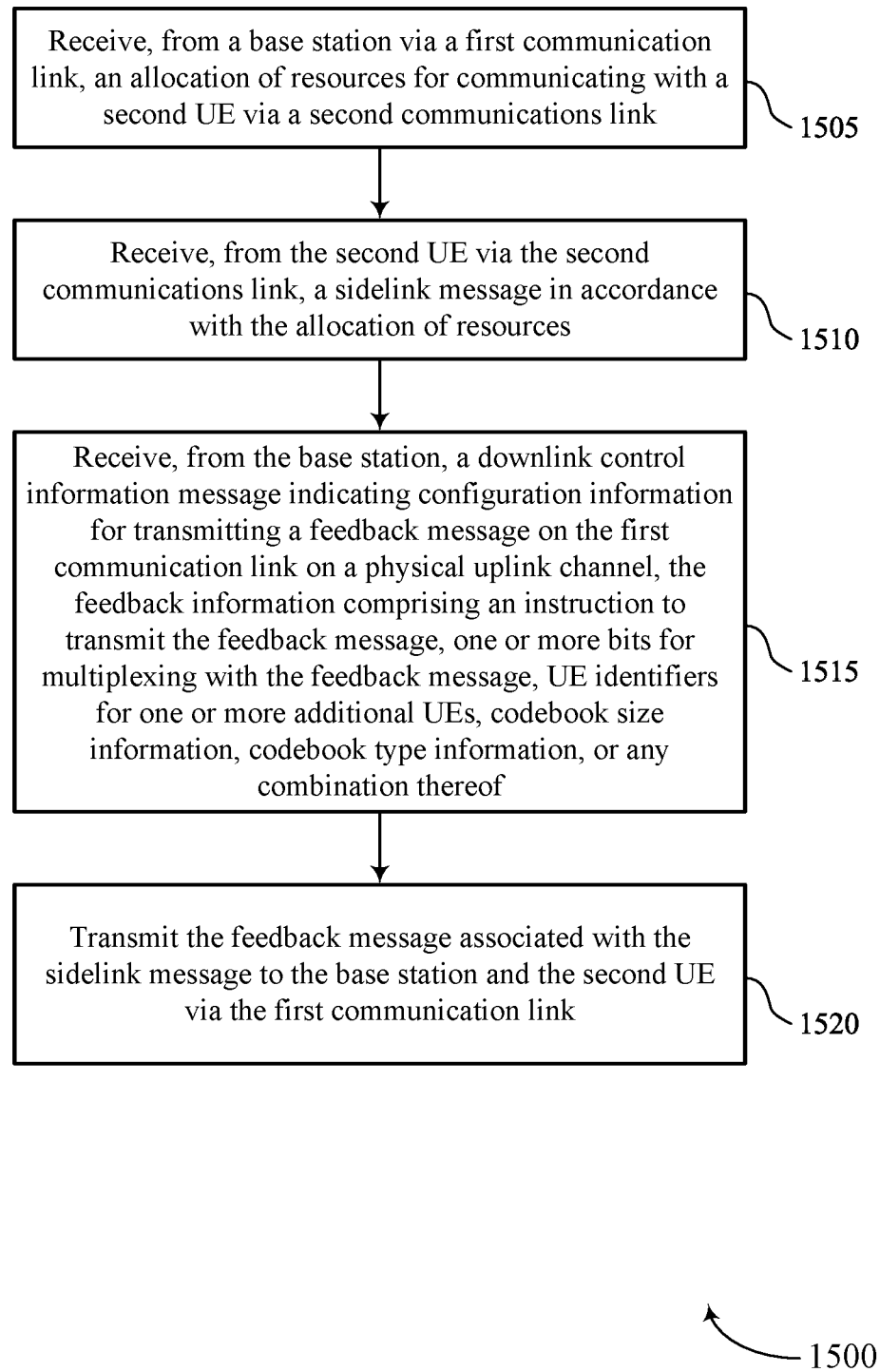

FIG. 15 shows a flowchart illustrating a method 1500 that supports sidelink feedback for multiple transmit receive points in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station via a first communication link, an allocation of resources for communicating with a second UE via a second communications link. The operations of 1505 may be performed in accordance with examples as disclosed herein. In some examples, aspects of the operations of 1505 may be performed by a resource manager 1125 as described with reference to FIG. 11.

At 1510, the method may include receiving, from the second UE via the second communications link, a sidelink message in accordance with the allocation of resources. The operations of 1510 may be performed in accordance with examples as disclosed herein. In some examples, aspects of the operations of 1510 may be performed by a sidelink message manager 1130 as described with reference to FIG. 11.

At 1515, the method may include receiving, from the base station, a downlink control information message indicating configuration information for transmitting a feedback message on the first communication link on a physical uplink channel, the feedback information including an instruction to transmit the feedback message, one or more bits for multiplexing with the feedback message, UE identifiers for one or more additional UEs, codebook size information, codebook type information, or any combination thereof. The operations of 1515 may be performed in accordance with examples as disclosed herein. In some examples, aspects of the operations of 1515 may be performed by a DCI manager 1145 as described with reference to FIG. 11.

At 1520, the method may include transmitting the feedback message associated with the sidelink message to the base station and the second UE via one or more of the first communication link, or the second communication link. The operations of 1520 may be performed in accordance with examples as disclosed herein. In some examples, aspects of the operations of 1520 may be performed by a feedback message manager 1135 as described with reference to FIG. 11.

Figure 16:
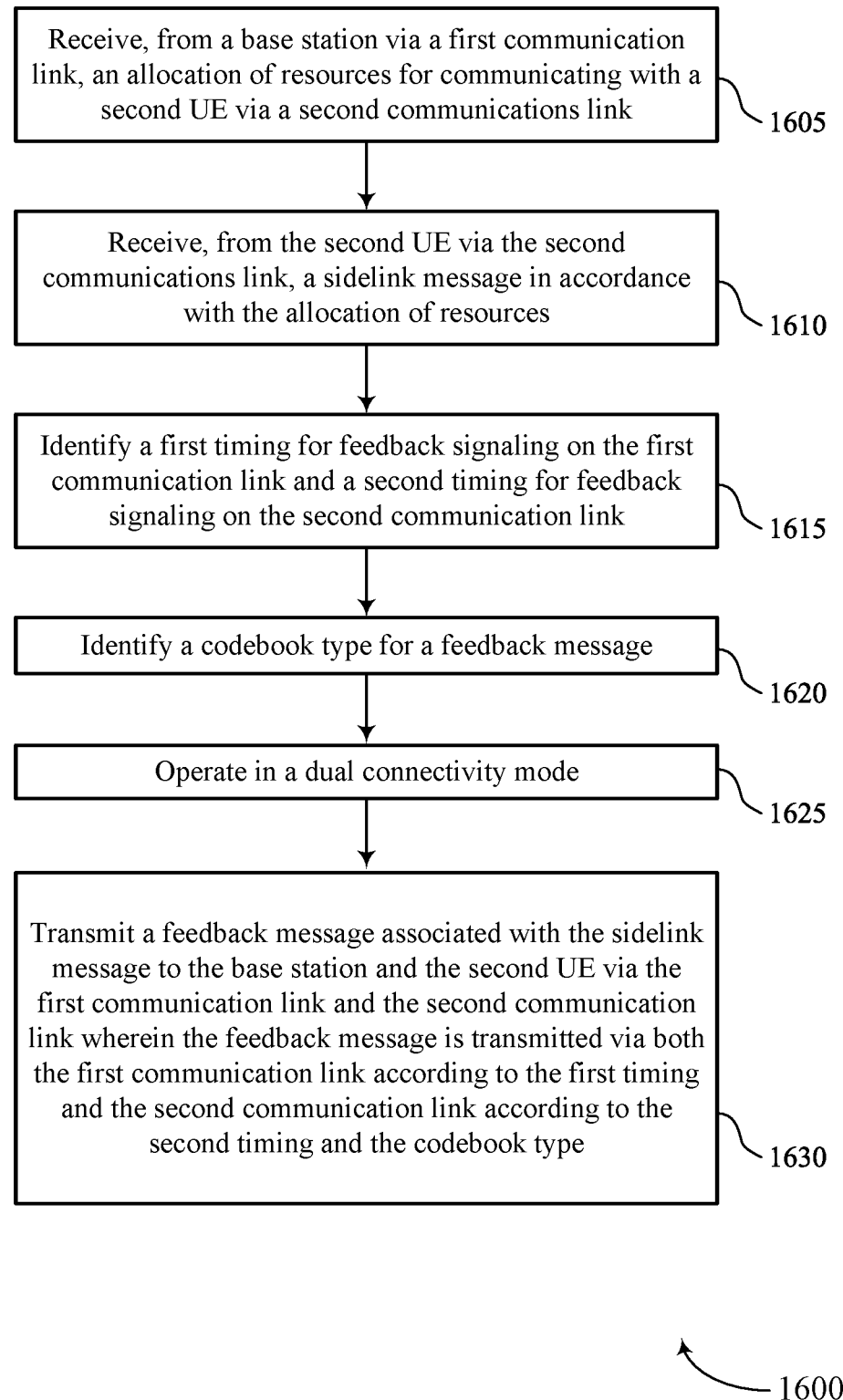

FIG. 16 shows a flowchart illustrating a method 1600 that supports sidelink feedback for multiple transmit receive points in accordance with aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station via a first communication link, an allocation of resources for communicating with a second UE via a second communications link. The operations of 1605 may be performed in accordance with examples as disclosed herein. In some examples, aspects of the operations of 1605 may be performed by a resource manager 1125 as described with reference to FIG. 11.

At 1610, the method may include receiving, from the second UE via the second communications link, a sidelink message in accordance with the allocation of resources. The operations of 1610 may be performed in accordance with examples as disclosed herein. In some examples, aspects of the operations of 1610 may be performed by a sidelink message manager 1130 as described with reference to FIG. 11.

At 1615, the method may include identifying a first timing for feedback signaling on the first communication link and a second timing for feedback signaling on the second communication link. The operations of 1615 may be performed in accordance with examples as disclosed herein. In some examples, aspects of the operations of 1615 may be performed by a dual connectivity manager 1160 as described with reference to FIG. 11.

At 1620, the method may include identifying a codebook type for a feedback message. The operations of 1620 may be performed in accordance with examples as disclosed herein. In some examples, aspects of the operations of 1620 may be performed by a dual connectivity manager 1160 as described with reference to FIG. 11.

At 1625, the method may include operating in a dual connectivity mode. The operations of 1625 may be performed in accordance with examples as disclosed herein. In some examples, aspects of the operations of 1625 may be performed by a dual connectivity manager 1160 as described with reference to FIG. 11.

At 1630, the method may include transmitting a feedback message associated with the sidelink message to the base station and the second UE via one or more of the first communication link, or the second communication link a feedback message associated with the sidelink message to the base station and the second UE via the first communication link and the second communication link wherein the feedback message is transmitted via both the first communication link according to the first timing and the second communication link according to the second timing and the codebook type. The operations of 1630 may be performed in accordance with examples as disclosed herein. In some examples, aspects of the operations of 1630 may be performed by a feedback message manager 1135 as described with reference to FIG. 11.

Figure 17:
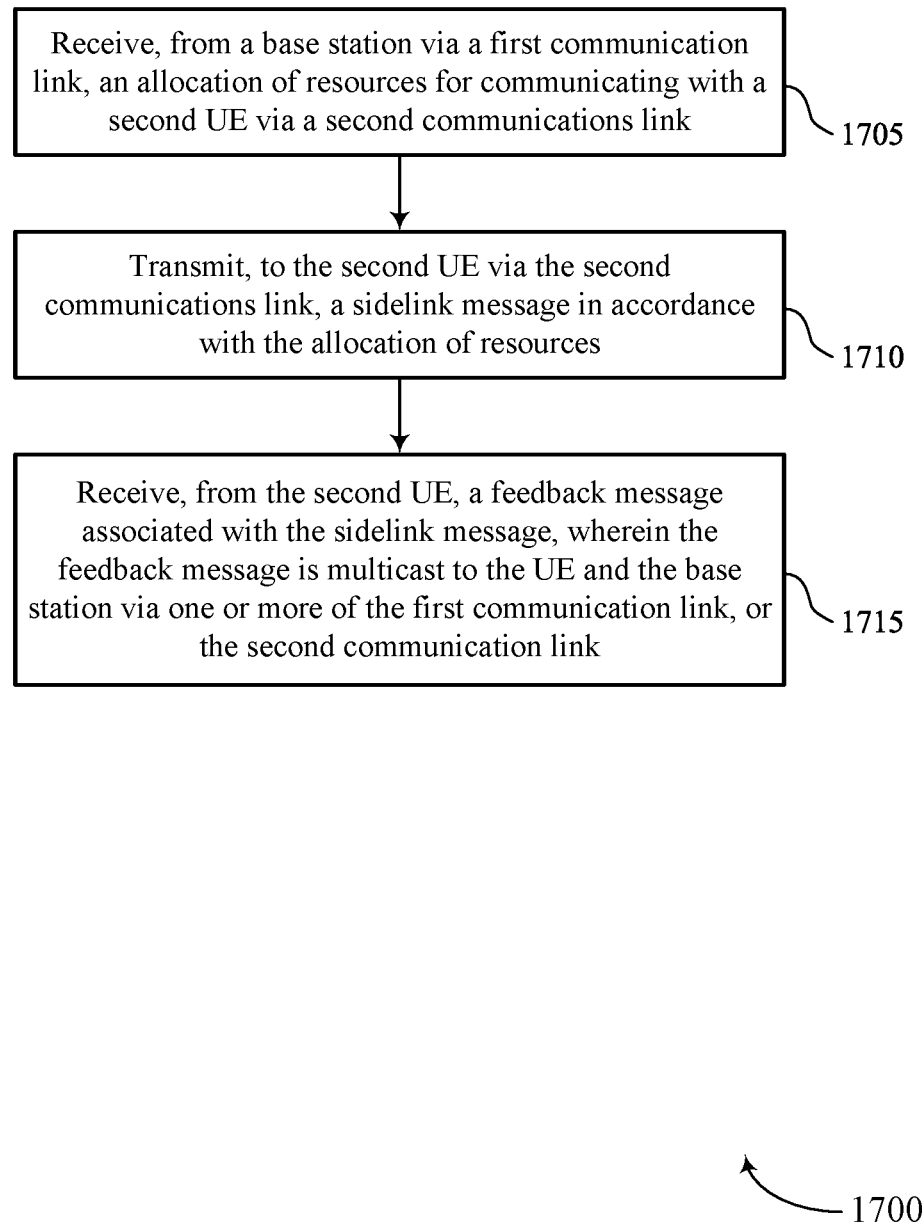

FIG. 17 shows a flowchart illustrating a method 1700 that supports sidelink feedback for multiple transmit receive points in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a base station via a first communication link, an allocation of resources for communicating with a second UE via a second communications link. The operations of 1705 may be performed in accordance with examples as disclosed herein. In some examples, aspects of the operations of 1705 may be performed by a resource manager 1125 as described with reference to FIG. 11.

At 1710, the method may include transmitting, to the second UE via the second communications link, a sidelink message in accordance with the allocation of resources. The operations of 1710 may be performed in accordance with examples as disclosed herein. In some examples, aspects of the operations of 1710 may be performed by a sidelink message manager 1130 as described with reference to FIG. 11.

At 1715, the method may include receiving, from the second UE, a feedback message associated with the sidelink message, where the feedback message is multicast to the UE and the base station via one or more of the first communication link, or the second communication link. The operations of 1715 may be performed in accordance with examples as disclosed herein. In some examples, aspects of the operations of 1715 may be performed by a feedback message manager 1135 as described with reference to FIG. 11.

The following provides an overview of aspects of the present disclosure:

Aspect 1: A method for wireless communications at a UE, comprising: receiving, from a base station via a first communication link, an allocation of resources for communicating with a second UE via a second communications link; receiving, from the second UE via the second communications link, a sidelink message in accordance with the allocation of resources; and transmitting a feedback message associated with the sidelink message to the base station and the second UE via one or more of the first communication link, or the second communication link.

Aspect 2: The method of aspect 1, further comprising: receiving, from the second UE, configuration information for the feedback message, the configuration information comprising an instruction to utilize resource allocated to the second UE by the base station for transmitting the feedback message on the first communication link on a physical uplink channel.

Aspect 3: The method of aspect 2, wherein the configuration information comprises: one or more additional feedback bits for multiplexing with the feedback message, time division multiplexing information, frequency division multiplexing information, space division multiplexing information, or any combination thereof.

Aspect 4: The method of any of aspects 2 through 3, wherein the configuration information comprises: an indication of a first type of codebook, codebook size information, a reporting time period, one or more bits for multiplexing with the feedback message, an indication of a size of the feedback message, a subcarrier spacing for a communication link between the second UE and the base station, a bandwidth part associated with the first communication link, a sidelink resource pool bitmap, an indication of a feedback channel periodicity, or any combination thereof.

Aspect 5: The method of any of aspects 2 through 4, wherein the configuration information comprises: an indication of a second type of codebook, codebook size information, an indication of a size of the feedback message, an indication of feedback signaling timing for both the first communication link and the second communication link, an indication of a time gap, time domain resource allocation, a sidelink resource pool bitmap, a periodicity for the second communication link, a minimum time gap for the second communication link, a service area identifier, or any combination thereof.

Aspect 6: The method of any of aspects 2 through 5, further comprising: transmitting, to the second UE, the base station, or both, capability information indicating a capability to multicast the feedback message to both the base station and the UE, wherein transmitting the feedback message is based at least in part on transmitting the capability information.

Aspect 7: The method of any of aspects 2 through 6, further comprising: receiving, from the second UE, an indication of one or more uplink resources of a set of one or more uplink resources on the physical uplink channel; determining, based at least in part on the indication of the one or more uplink resources, at least one of the one or more resources for transmitting the feedback message; and transmitting the feedback message on the determined at least one of the one or more resources.

Aspect 8: The method of any of aspects 2 through 7, further comprising: receiving, from the second UE, uplink signaling information comprising feedback information associated with a third communications link between the second UE and the base station, channel state information, one or more scheduling requests, or any combination thereof, wherein the configuration information comprises one or more rules for multiplexing the signaling information with the feedback message; and multiplexing the signaling information with the feedback message in accordance with the one or more rules and based at least in a part on a codebook type for the feedback message, wherein transmitting the feedback message is based at least in part on the multiplexing.

Aspect 9: The method of any of aspects 2 through 8, further comprising: receiving, from the second UE, a second feedback message associated with a second sidelink message transmitted by the second UE to a third UE; and multiplexing the second feedback message with the feedback message, wherein transmitting the feedback message is based at least in part on the multiplexing.

Aspect 10: The method of any of aspects 2 through 9, further comprising: monitoring a third communication link between the second UE and a third UE; receiving a second feedback message transmitted by the third UE to the second UE; and including the second feedback message in the feedback message.

Aspect 11: The method of aspect 10, further comprising: receiving, from the base station, an instruction to monitor the third communication link for the second feedback message, an instruction to include the second feedback message in the feedback message, or both.

Aspect 12: The method of any of aspects 1 through 11, further comprising: receiving, from the base station, a downlink control information message indicating configuration information for transmitting the feedback message on the first communication link on a physical uplink channel, the feedback information comprising an instruction to transmit the feedback message, one or more bits for multiplexing with the feedback message, UE identifiers for one or more additional UEs, codebook size information, codebook type information, or any combination thereof.

Aspect 13: The method of aspect 12, further comprising: aggregating feedback information associated with a set of one or more transmissions from the second UE, the set of one or more transmissions comprising the sidelink message; and generating the feedback message based at least in part on the aggregated feedback information.

Aspect 14: The method of any of aspects 12 through 13, further comprising: receiving, from the base station, an indication of a codebook size; determining a size of the feedback message based at least in part on the indication of the codebook size and an identifier for the UE; and generating the feedback message according to the determined size.

Aspect 15: The method of any of aspects 1 through 14, further comprising: determining a first type of codebook for the feedback message based at least in part on a slot timing indicated via higher layer signaling, a subcarrier spacing associated with the first communication link, a bandwidth part associated with the second communication link, a resource pool bitmap associated with the second communication link, a periodicity of feedback signaling associated with the second communication link, or any combination thereof, wherein transmitting the feedback message is based at least in part on determining the first type of codebook.

Aspect 16: The method of any of aspects 1 through 15, further comprising: determining a second type of codebook for the feedback message based at least in part on a feedback signaling timing for both the first communication link and the second communication link, a time gap indicated in the configuration information, a time domain resource allocation indicated in the configuration information, a sidelink resource pool bitmap, a feedback signaling periodicity on the second communication link, a minimum time gap associated with the second communication link, a service area identifier indicated in the configuration information, or any combination thereof, wherein transmitting the feedback message is based at least in part on determining the second type of codebook.

Aspect 17: The method of any of aspects 1 through 16, further comprising: receiving, from the second UE, an indication of a codebook for the feedback message, wherein transmitting the feedback message is based at least in part on receiving the indication of the codebook size.

Aspect 18: The method of any of aspects 1 through 17, further comprising: determining a transmit power associated with the first communication link and a second transmit power associated with the second communication link; comparing the first transmit power and the second transmit power to determine which is larger; and selecting, for transmitting the feedback message, one of the first transmit power or the second transmit power based at least in part on the comparing.

Aspect 19: The method of any of aspects 1 through 18, further comprising: determining one or more sidelink resources from a pool of one or more sidelink resources associated with the second communications link, the second communications link comprising a sidelink, wherein the feedback message is transmitted via the determined one or more sidelink resources.

Aspect 20: The method of aspect 19, further comprising: receiving, from the base station, an indication of the one or more sidelink resources, wherein determining the one or more sidelink resources is based at least in part on the indication of the one or more sidelink resources.

Aspect 21: The method of any of aspects 19 through 20, further comprising: receiving, from the second UE, an indication of the one or more sidelink resources, wherein determining the one or more sidelink resources is based at least in part on the indication of the one or more sidelink resources.

Aspect 22: The method of any of aspects 1 through 21, further comprising: identifying a first timing for feedback signaling on the first communication link and a second timing for feedback signaling on the second communication link; identifying a codebook type for the feedback message; and operating in a dual connectivity mode, wherein the feedback message is transmitted via both the first communication link according to the first timing and the second communication link according to the second timing and the codebook type.

Aspect 23: The method of aspect 22, wherein the feedback message is transmitted consecutively on the first communication link and the second communication link, based at least in part on the processing capability of the UE.

Aspect 24: The method of any of aspects 22 through 23, wherein the feedback message is transmitted simultaneously on the first communication link and the second communication link, based at least in part on the processing capability of the UE.

Aspect 25: A method for wireless communications at a UE, comprising: receiving, from a base station via a first communication link, an allocation of resources for communicating with a second UE via a second communications link; transmitting, to the second UE via the second communications link, a sidelink message in accordance with the allocation of resources; and receiving, from the second UE, a feedback message associated with the sidelink message, wherein the feedback message is multicast to the UE and the base station via one or more of the first communication link, or the second communication link.

Aspect 26: The method of aspect 25, further comprising: transmitting, to the second UE, configuration information for the feedback message, the configuration information comprising an instruction to utilize resource allocated to the UE by the base station for transmitting the feedback message on the first communication link on a physical uplink channel.

Aspect 27: The method of aspect 26, further comprising: receiving, from the base station, transmission configuration information for the feedback message, the transmission configuration information comprising a time-division multiplexing configuration, a frequency division multiplexing configuration, a single-frequency network configuration, or any combination thereof; and transmitting the transmission configuration information not the second UE, wherein receiving the feedback message is based at least in part on transmitting the configuration information.

Aspect 28: The method of any of aspects 25 through 27, further comprising: selecting the second UE from a set of UEs based at least in part on a transmission configuration associated with each UE of the set of UEs, or based on a timing of the feedback message associated with the sidelink message for the second UE, or any combination thereof; and transmitting, to the second UE, an instruction to transmit the feedback message to the UE and the base station based at least in part on the selecting.

Aspect 29: An apparatus for wireless communications at a UE, comprising a processor; memory coupled with the processor; and instructions stored in the memory and executable by the processor to cause the apparatus to perform a method of any of aspects 1 through 24.

Aspect 30: An apparatus for wireless communications at a UE, comprising at least one means for performing a method of any of aspects 1 through 24.

Aspect 31: A non-transitory computer-readable medium storing code for wireless communications at a UE, the code comprising instructions executable by a processor to perform a method of any of aspects 1 through 24.

Aspect 32: An apparatus for wireless communications at a UE, comprising a processor; memory coupled with the processor; and instructions stored in the memory and executable by the processor to cause the apparatus to perform a method of any of aspects 25 through 28.

Aspect 33: An apparatus for wireless communications at a UE, comprising at least one means for performing a method of any of aspects 25 through 28.

Aspect 34: A non-transitory computer-readable medium storing code for wireless communications at a UE, the code comprising instructions executable by a processor to perform a method of any of aspects 25 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a network entity, comprising:
  a processing system that includes one or more processors and one or more memories coupled with the one or more processors, the processing system configured to cause the apparatus to:
    output, to a first user equipment (UE) via a first communication link, an allocation of resources for communicating with a second UE via a second communication link;
    output, to the first UE, configuration information for transmitting a first hybrid automatic repeat request (HARQ) feedback message to the network entity and a second HARQ feedback message to the second UE; and
    obtain, from the first UE, the first HARQ feedback message via one or more of the first communication link, or the second communication link, the first HARQ feedback message indicating whether the first UE received a sidelink message from the second UE via the second communication link according to the allocation of resources.

2. The apparatus of claim 1, wherein the processing system is further configured to cause the apparatus to:
  obtain, from the first UE, capability information indicating a capability of the first UE to multicast the first HARQ feedback message and the second HARQ feedback message for the second UE, reception of the first HARQ feedback message being in accordance with the capability information.

3. The apparatus of claim 1, wherein the processing system is further configured to cause the apparatus to:
  output, to the first UE, an instruction to monitor a third communication link for a third HARQ feedback message, an instruction to include the third HARQ feedback message in at least one of the first HARQ feedback message or a fourth HARQ feedback message, or both instructions.

4. The apparatus of claim 3, wherein the first HARQ feedback message comprises the third HARQ feedback message indicating that the first UE received a second sidelink message from the second UE via the third communication link.

5. The apparatus of claim 1, wherein the processing system is further configured to cause the apparatus to:
output, to the first UE, a downlink control information message indicating the configuration information for transmitting the first HARQ feedback message and the second HARQ feedback message on the first communication link on a physical uplink channel, the configuration information comprising an instruction to transmit the first HARQ feedback message and the second HARQ feedback message, one or more bits for multiplexing with the first HARQ feedback message and the second HARQ feedback message, UE identifiers for one or more additional UEs, codebook size information, codebook type information, or any combination thereof.

6. The apparatus of claim 5, wherein the first HARQ feedback message comprises aggregated feedback information associated with a set of one or more transmission from the second UE, the set of one or more transmission comprising the sidelink message.

7. The apparatus of claim 1, wherein the processing system is further configured to cause the apparatus to:
output, to the first UE, an indication of a codebook size, a size of the first HARQ feedback message being in accordance with the indication of the codebook size.

8. The apparatus of claim 1, wherein the first HARQ feedback message is received in accordance with a first type of codebook for the first HARQ feedback message according to a slot timing indicated via higher layer signaling, a subcarrier spacing associated with the first communication link, a bandwidth part associated with the second communication link, a resource pool bitmap associated with the second communication link, a periodicity of feedback signaling associated with the second communication link, or any combination thereof.

9. The apparatus of claim 1, wherein the first HARQ feedback message is received in accordance with a second type of codebook for the first HARQ feedback message according to a feedback signaling timing for both the first communication link and the second communication link, a time gap indicated in the configuration information, a time domain resource allocation indicated in the configuration information, a sidelink resource pool bitmap, a feedback signaling periodicity on the second communication link, a minimum time gap associated with the second communication link, a service area identifier indicated in the configuration information, or any combination thereof.

10. The apparatus of claim 1, wherein the allocation of resources comprises an indication of one or more sidelink resources from a pool of one or more sidelink resources associated with the second communication link, the second communication link comprising a sidelink.

11. An apparatus for wireless communications at a user equipment (UE), comprising:
a processing system that includes one or more processors and one or more memories coupled with the one or more processors, the processing system configured to cause the apparatus to:
receive, from a network entity via a first communication link, an allocation of resources for communicating with a second UE via a second communication link;
receive, from the network entity, control signaling indicating configuration information for transmitting a first hybrid automatic repeat request (HARQ) feedback message to the network entity and a second HARQ feedback message to the second UE;
receive, from the second UE via the second communication link, a sidelink message in accordance with the allocation of resources; and
transmit the first HARQ feedback message and the second HARQ feedback message according to the configuration information.

12. The apparatus of claim 11, wherein the processing system configured to cause the apparatus to transmit the first HARQ feedback message and the second HARQ feedback message is further configured to cause the apparatus to:
transmit the first HARQ feedback message associated with the sidelink message to the network entity via one or more of the first communication link, or the second communication link; and
transmit the second HARQ feedback message associated with the sidelink message to the second UE via one or more of the first communication link, or the second communication link.

13. The apparatus of claim 11, wherein the configuration information comprises an instruction to transmit the first HARQ feedback message and the second HARQ feedback message, one or more bits for multiplexing with the first HARQ feedback message or the second HARQ feedback message, UE identifiers for one or more additional UEs, codebook size information, codebook type information, or any combination thereof.

14. The apparatus of claim 11, wherein the configuration information comprises a first type of codebook, a slot timing, a subcarrier spacing associated with the first communication link, a bandwidth part associated with the second communication link, a resource pool bitmap associated with the second communication link, a periodicity of feedback signaling associated with the second communication link, or any combination thereof.

15. The apparatus of claim 11, wherein the configuration information comprises a second type of codebook, a feedback signaling timing for both the first communication link and the second communication link, a time gap, a time domain resource allocation, a sidelink resource pool bitmap, a feedback signaling periodicity on the second communication link, a minimum time gap associated with the second communication link, a service area identifier, or any combination thereof.

16. The apparatus of claim 11, wherein the allocation of resources comprises an indication of one or more sidelink resources from a pool of one or more sidelink resources associated with the second communication link, the second communication link comprising a sidelink.

17. The apparatus of claim 11, wherein the configuration information is for transmitting the first HARQ feedback message and the second HARQ feedback message via a physical uplink channel on the first communication link.

18. A method of wireless communications at a network entity, comprising:
outputting, to a first user equipment (UE) via a first communication link, an allocation of resources for communicating with a second UE via a second communication link;

outputting, to the first UE, configuration information for transmitting a first hybrid automatic repeat request (HARQ) feedback message to the network entity and a second HARQ feedback message to the second UE; and obtaining, from the first UE, the first HARQ feedback message via one or more of the first communication link, or the second communication link, the first HARQ feedback message indicating whether the first UE received a sidelink message from the second UE via the second communication link according to the allocation of resources.

19. The method of claim 18, further comprising:

obtaining, from the first UE, capability information indicating a capability of the first UE to multicast the first HARQ feedback message and the second HARQ feedback message for the second UE, reception of the first HARQ feedback message being in accordance with the capability information.

20. The method of claim 18, further comprising:

outputting, to the first UE, a downlink control information message indicating the configuration information for transmitting the first HARQ feedback message and the second HARQ feedback message on the first communication link on a physical uplink channel, the configuration information comprising an instruction to transmit the first HARQ feedback message and the second HARQ feedback message, one or more bits for multiplexing with the first HARQ feedback message and the second HARQ feedback message, UE identifiers for one or more additional UEs, codebook size information, codebook type information, or any combination thereof.

* * * * *